US012120566B2

(12) United States Patent
Zhou et al.

(10) Patent No.: US 12,120,566 B2
(45) Date of Patent: Oct. 15, 2024

(54) SATELLITE COMMUNICATION METHOD AND APPARATUS

(71) Applicant: HUAWEI TECHNOLOGIES CO., LTD., Guangdong (CN)

(72) Inventors: Jianwei Zhou, Hangzhou (CN); Hejia Luo, Hangzhou (CN); Chenlei Xu, Hangzhou (CN); Xiaolu Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 293 days.

(21) Appl. No.: 17/704,733

(22) Filed: Mar. 25, 2022

(65) Prior Publication Data

US 2022/0217600 A1    Jul. 7, 2022

Related U.S. Application Data

(63) Continuation of application No. PCT/CN2020/113415, filed on Sep. 4, 2020.

(30) Foreign Application Priority Data

Sep. 27, 2019   (CN) .......................... 201910924094.4

(51) Int. Cl.
*H04W 36/06* (2009.01)
*H04W 56/00* (2009.01)
*H04W 72/0446* (2023.01)
*H04W 72/21* (2023.01)

(52) U.S. Cl.
CPC ......... *H04W 36/06* (2013.01); *H04W 56/003* (2013.01); *H04W 72/0446* (2013.01); *H04W 72/21* (2023.01)

(58) Field of Classification Search
None
See application file for complete search history.

(56) References Cited

U.S. PATENT DOCUMENTS 11,832,205 B2 *   11/2023   Ryu .................. H04W 56/0045
2018/0192386 A1    7/2018   Rudrapatna
(Continued)

FOREIGN PATENT DOCUMENTS

CN    101572577 A    11/2009
CN    105027640 A    11/2015
(Continued)

OTHER PUBLICATIONS

Huawei et al., "Evaluation of DL Synchronization and Central Frequency Tracking for NTN," 3GPP TSG RAN WG1 Meeting #97, R1-1905998, Reno, USA, May 13-17, 2019, 7 pages.
(Continued)

*Primary Examiner* — Lonnie V Sweet
(74) *Attorney, Agent, or Firm* — Fish & Richardson P.C.

(57) ABSTRACT

This application provides example satellite communication methods and example apparatuses. One example method includes receiving, by a terminal device, first information sent by a satellite, where the first information indicates a first timing change rate range. The terminal device can then measure a downlink timing change rate to obtain a first downlink timing change rate. The terminal device can then determine a first uplink timing change rate based on the first downlink timing change rate and the first timing change rate range. The terminal device can then perform uplink communication with the satellite based on the first uplink timing change rate.

19 Claims, 5 Drawing Sheets

(56) References Cited

U.S. PATENT DOCUMENTS

| | | | |
|---|---|---|---|
| 2019/0141697 A1 | 5/2019 | Islam et al. | |
| 2019/0223178 A1* | 7/2019 | Bergstrom | H04W 56/0045 |
| 2019/0268869 A1 | 8/2019 | Akkarakaran et al. | |
| 2020/0245324 A1* | 7/2020 | Kim | H04L 25/0226 |
| 2021/0168869 A1* | 6/2021 | Gupta | H04L 27/2607 |
| 2022/0264497 A1* | 8/2022 | Wiacek | H04W 56/001 |

FOREIGN PATENT DOCUMENTS

| | | |
|---|---|---|
| CN | 106162858 A | 11/2016 |
| CN | 107197517 A | 9/2017 |
| CN | 108282198 A | 7/2018 |
| CN | 109474986 A | 3/2019 |
| CN | 109842932 A | 6/2019 |

OTHER PUBLICATIONS

Huawei et al., "Discussion on Doppler Compensation, Timing Advance and RACH for NTN," 3GPP TSG RAN WG1 Meeting #98, R1-1908049, Prague, Czech Republic, Aug. 26-30, 2019, 36 pages.

ZTE Corporation et al., "Remaining Issue on RACH for NTN," 3GPP TSG RAN WG2 Meeting #106, R2-1906114, Reno, USA, May 13-17, 2019, 6 pages.

Extended European Search Report in European Appln No. 20870353.8, dated Oct. 5, 2022, 11 pages.

Fraunhofer IIS, "NTN NR impacts Timing Advance," 3GPP TSG RAN1 Meeting #91, R1-1720375, Reno, USA, Nov. 27-Dec. 1, 2017, 4 pages.

Nokia et al., "Doppler Compensation, Uplink Timing Advance, Random Access and UE Location in NTN," 3GPP TSG RAN WG1 Meeting #96bis, R1-1904650, Xi'an, China, Apr. 8-12, 2019, 15 pages.

Nokia, "UL Timing Accuracy and Update Rate," 3GPP TSG RAN WG1 #47bis, R1-070400, Sorrento, Italy, Jan. 15-19, 2007, 3 pages.

Office Action issued in Chinese Application No. 201910924094.4 on Jul. 30, 2021, 20 pages (with English translation).

PCT International Search Report and Written Opinion issued in International Application No. PCT/CN2020/113415 on Dec. 9, 2020, 13 pages (with English translation).

* cited by examiner

SATELLITE COMMUNICATION METHOD AND APPARATUS

CROSS-REFERENCE TO RELATED APPLICATIONS

This application is a continuation of International Application No. PCT/CN2020/113415, filed on Sep. 4, 2020, which claims priority to Chinese Patent Application No. 201910924094.4, filed on Sep. 27, 2019. The disclosures of the aforementioned applications are hereby incorporated by reference in their entireties.

TECHNICAL FIELD

This application relates to the communication field, and more specifically, to a satellite communication method and an apparatus.

BACKGROUND

A 5th generation (5G) system and a future evolved network thereof not only need to satisfy a plurality of service requirements, but also need to provide wider service coverage. With development of communication technologies, the 3rd generation partnership project (3GPP) standards organization has proposed to research a space-ground integrated communication technology subsequently to integrate satellite communication with a terrestrial-based cellular network and implement seamless coverage of wireless signals on the entire earth, and proposed a non-terrestrial network (NTN). The NTN network, especially a satellite communication network, is less impacted by a geographical condition. Therefore, an objective of global coverage can be achieved through satellite communication.

Satellites in other types of satellite systems than a synchronous orbit satellite system all have a moving velocity relative to the ground, and a lower orbit height indicates a higher relative velocity. Due to a relatively high relative moving velocity of the satellite, an actual uplink timing location of a terminal device changes relatively greatly in a timing advance (TA) update periodicity, that is, uplink timing drift occurs, which relatively greatly impacts performance of an uplink using an orthogonal frequency division multiplexing (OFDM) modulated carrier.

Currently, a main method for resolving a problem of the uplink timing drift in the TA update periodicity is that the satellite selects a reference point based on a current beam location to deliver a common timing advance change rate (Common TA Rate) or delivers a user equipment (UE)-specific timing change rate (UE-specific TA Rate), and UE autonomously adjusts an uplink sending timing location in the TA update periodicity based on the common TA rate or the UE-specific TA rate. Although the problem of the uplink timing drift can be resolved to some extent, a manner in which adjustment is performed by using the common timing advance change rate still has a quite large deviation, and a manner in which the satellite delivers the UE-specific TA rate has problems such as a long calculation time period and large signaling overheads.

Therefore, how to better resolve the problem of the uplink timing drift and improve the uplink performance is a problem that needs to be urgently resolved.

SUMMARY

This application provides a satellite communication method and an apparatus, to resolve a problem of uplink timing drift in a TA update periodicity in satellite communication, and improve uplink performance.

According to a first aspect, this application provides a satellite communication method. The method includes: receiving, by a terminal device, first information from a satellite, where the first information is used to indicate a first timing change rate range; measuring, by the terminal device, a downlink timing change rate to obtain a first downlink timing change rate; determining a first uplink timing change rate based on the first downlink timing change rate and the first timing change rate range; and performing uplink communication based on the first uplink timing change rate.

In the technical solution in this application, the satellite sends the first information used to indicate the first timing change rate range, to assist the terminal device in determining the first uplink timing change rate and adjusting an uplink timing change location. The satellite does not need to separately calculate and send an uplink timing change rate of each terminal device, so that a calculation time period and signaling overheads can be reduced.

In addition, the terminal device measures the downlink timing change rate, to obtain measurement data having higher precision. Therefore, the first uplink timing change rate determined based on the measurement data also has higher precision. The terminal device determines the first uplink timing change rate based on the first timing change rate range determined by using the first information sent by the satellite, so that correction of uplink timing drift can be more accurate.

With reference to the first aspect, in some implementations of the first aspect, the terminal device receives the first information, where the first information includes a maximum timing change rate and a minimum timing change rate. Therefore, after receiving the first information, the terminal device can directly determine the first timing change rate range based on the maximum timing change rate and the minimum timing change rate.

With reference to the first aspect, in some implementations of the first aspect, the first information includes an indication that may be used to determine the maximum timing change rate and the minimum timing change rate. Therefore, after receiving the first information, the terminal device can determine the first timing change rate range through conversion.

With reference to the first aspect, in some implementations of the first aspect, the first information can indicate a second timing change rate. Therefore, after receiving the first information, the terminal device can determine the first timing change rate range based on the second timing change rate and an offset thereof.

With reference to the first aspect, in some implementations of the first aspect, the terminal device determines, based on a first mapping relationship, a first preset range corresponding to a first beam, where the first mapping relationship is used to indicate a first preset range corresponding to each of a plurality of beams including the first beam; and determines, as the first timing change rate range, the first preset range corresponding to the first beam.

With reference to the first aspect, in some implementations of the first aspect, the terminal device measures and obtains the downlink timing change rate, and the terminal device obtains the downlink timing change rate by collecting statistics on a quantity of timing change points within a period of time and a timing change periodicity.

The terminal device autonomously performs measurement, so that a downlink timing change rate specific to each terminal device can be obtained, and an actual downlink timing change rate of the terminal device can be reflected.

With reference to the first aspect, in some implementations of the first aspect, the terminal device continuously and periodically measures the downlink timing change rate.

The terminal device continuously performs measurement, so that a real-time downlink timing change rate of the terminal device can be obtained, and downlink timing change rates of the terminal device at different moments can be reflected.

With reference to the first aspect, in some implementations of the first aspect, the terminal device performs iteration on the downlink timing change rate. When a value of a downlink timing change rate at a current moment is to be determined, a value of a downlink timing change rate at a previous moment and an actual measurement value at the current moment are comprehensively considered, the actual measurement value at the current moment is adjusted, and an adjusted value is determined as a first downlink timing change rate at the current moment.

Precision of the downlink timing change rate can be improved by comprehensively considering measurement data at the current moment and historical data.

With reference to the first aspect, in some implementations of the first aspect, the terminal device may further introduce a weighting coefficient, set different weights of the downlink timing change rates at the different moments, and adjust, by using the weights when iteration is performed on the downlink timing change rate, impact of the downlink timing change rates at the different moments on a final result, so that the precision of the downlink timing change rate can be further improved.

With reference to the first aspect, in some implementations of the first aspect, after obtaining the first downlink timing change rate, the terminal device determines a second uplink timing change rate corresponding to the first downlink timing change rate, and then determines the first uplink timing change rate based on a relationship between the second uplink timing change rate and the first timing change rate range determined by using the first information.

The second uplink timing change rate is determined based on the first downlink timing change rate obtained through measurement, and has higher precision. The first timing change rate range is determined based on the first information sent by the satellite. Therefore, the terminal device determines the first uplink timing change rate based on the second uplink timing change rate in combination with the first timing change rate range, so that a better uplink timing change rate can be obtained. Therefore, correction of the uplink timing drift can be more accurate.

With reference to the first aspect, in some implementations of the first aspect, after obtaining the first downlink timing change rate, the terminal device determines a second downlink timing change rate based on a relationship between the first downlink timing change rate and the first timing change rate range determined by using the first information, and then determines the first uplink timing change rate based on a correspondence between the second downlink timing change rate and the first uplink timing change rate.

The terminal device determines the first uplink timing change rate by comprehensively considering the first downlink timing change rate and the first timing change rate range, so that the better uplink timing change rate can be obtained. Therefore, correction of the uplink timing drift can be more accurate.

According to a second aspect, this application provides a satellite communication method. The method includes: measuring, by a terminal device, a downlink timing change rate, to obtain a first downlink timing change rate; determining a first uplink timing change rate based on the first downlink timing change rate; and performing uplink communication based on the first uplink timing change rate.

In the technical solution in this application, the terminal device autonomously performs measurement, so that a downlink timing change rate of each terminal device can be obtained, and an actual downlink timing change rate of the terminal device can be reflected. Therefore, the first uplink timing change rate determined based on the downlink timing change rate also has higher precision. When uplink communication is performed based on the first uplink timing change rate, uplink timing drift can be effectively reduced, and uplink communication performance can be improved.

With reference to the second aspect, in some implementations of the second aspect, the terminal device measures and obtains the downlink timing change rate, and the terminal device obtains the downlink timing change rate by collecting statistics on a quantity of timing change points within a period of time and a timing change periodicity.

With reference to the second aspect, in some implementations of the second aspect, the terminal device continuously and periodically measures the downlink timing change rate.

The terminal device continuously performs measurement, so that a real-time downlink timing change rate of the terminal device can be obtained, and downlink timing change rates of the terminal device at different moments can be reflected.

With reference to the second aspect, in some implementations of the second aspect, the terminal device performs iteration on the downlink timing change rate. When a value of a downlink timing change rate at a current moment is to be determined, a value of a downlink timing change rate at a previous moment and an actual measurement value at the current moment are comprehensively considered, the actual measurement value at the current moment is adjusted, and an adjusted value is determined as a first downlink timing change rate at the current moment.

Precision of the downlink timing change rate can be improved by comprehensively considering measurement data at the current moment and historical data.

With reference to the second aspect, in some implementations of the second aspect, the terminal device introduces a weighting coefficient, set different weights of the downlink timing change rates at the different moments, and adjusts, by using the weights when iteration is performed on the downlink timing change rate, impact of the downlink timing change rates at the different moments on a final result, so that the precision of the downlink timing change rate can be further improved.

With reference to the second aspect, in some implementations of the second aspect, the terminal device sets a first determining condition, and determines the first uplink timing change rate based on the first downlink timing change rate when the first downlink timing change rate satisfies the first determining condition.

Data that does not satisfy a determining condition can be excluded by setting the determining condition, to improve precision.

With reference to the second aspect, in some implementations of the second aspect, the terminal device sets the first determining condition, and determines the first uplink timing change rate by using another parameter when the first downlink timing change rate does not satisfy the first determining condition.

Bad data is corrected by introducing the another parameter, and is not directly discarded, to further improve the precision.

With reference to the second aspect, in some implementations of the second aspect, the terminal device sets the first determining condition to the first timing change rate range in the first aspect, to obtain the technical effects corresponding to the first aspect.

According to a third aspect, this application provides a satellite communication method. The method includes: determining, by a satellite, a first timing change rate range, and sending first information to a terminal device, where the first information is used to indicate the first timing change rate range.

In the technical solution in this application, the satellite assists the terminal device in determining a first uplink timing change rate and adjusting an uplink timing change location. The satellite does not need to separately calculate and send an uplink timing change rate of each terminal device, so that a calculation time period and signaling overheads can be reduced.

With reference to the third aspect, in some implementations of the third aspect, the satellite obtains a maximum timing change rate and a minimum timing change rate, and determines the first timing change rate range based on the maximum timing change rate and the minimum timing change rate.

The satellite determines a range by determining boundary values, to reduce calculation and a statistical time period.

With reference to the third aspect, in some implementations of the third aspect, the satellite obtains a satellite status parameter, and obtains the maximum timing change rate and the minimum timing change rate based on the satellite status parameter and a calculation formula of a timing change rate.

Data obtained through formula calculation is more accurate.

With reference to the third aspect, in some implementations of the third aspect, the satellite determines a third timing change rate, and determines the maximum timing change rate and the minimum timing change rate based on the third timing change rate and upward and downward offsets thereof.

A range is determined based only on one piece of data, to facilitate representation and reduce calculation.

With reference to the third aspect, in some implementations of the third aspect, the third timing change rate is obtained through calculation by using the calculation formula of the timing change rate.

With reference to the third aspect, in some implementations of the third aspect, a timing change rate of a terminal device with a minimum transmission delay is determined as the third timing change rate, or a timing change rate of a terminal device closest to the satellite is determined as the third timing change rate.

With reference to the third aspect, in some implementations of the third aspect, corresponding timing change rate ranges are preset for different beams, and a mapping relationship between beam IDs and the preset timing change rate ranges is established. After a beam ID is determined, a corresponding preset timing change rate range is determined as the first timing change rate range by using the mapping relationship.

With reference to the third aspect, in some implementations of the third aspect, the satellite sends the first information to the terminal device, where the first information is used to indicate the first timing change rate range.

With reference to the third aspect, in some implementations of the third aspect, the first information includes the maximum timing change rate and the maximum timing change rate.

In this manner, after receiving the first information, the terminal device can directly determine the first timing change rate range.

With reference to the third aspect, in some implementations of the third aspect, the first information includes an indication that may be used to determine the maximum timing change rate and the minimum timing change rate. After receiving the first information, the terminal device determines the first timing change rate range through conversion. The maximum timing change rate and the minimum timing change rate may be determined by using the method in the second aspect.

With reference to the third aspect, in some implementations of the third aspect, the first information can indicate a second timing change rate. Therefore, after receiving the first information, the terminal device can determine the first timing change rate range based on the second timing change rate and by invoking an offset thereof.

The satellite only needs to send an indication of the second timing change rate, so that signaling overheads are reduced.

With reference to the third aspect, in some implementations of the third aspect, the first information can indicate the second timing change rate and the offset thereof. Therefore, after receiving the first information, the terminal device can determine the first timing change rate range based on the second timing change rate and the offset.

The first information can indicate both the second timing change rate and the offset thereof, and the offset does not need to be invoked.

With reference to the third aspect, in some implementations of the third aspect, the first information is used to indicate a first identifier. There is a determined mapping relationship between the first identifier and the first timing change rate range. When the first identifier is determined, the first timing change rate range can be determined based on the mapping relationship.

According to a fourth aspect, this application provides a satellite communication method. The method includes: receiving, by a terminal device, first information from a satellite, where the first information can indicate a first timing change rate range, or the first information can indicate a first uplink timing change rate determined by the satellite based on a first uplink timing change rate range; and determining, by the terminal device, a second uplink timing change rate based on the first information, and performing uplink communication based on the second uplink timing change rate.

With reference to the fourth aspect, in some implementations of the fourth aspect, the first information is specifically used to indicate the first timing change rate range. The terminal device determines the second uplink timing change rate based on the first timing change rate range.

Optionally, the terminal device determines an average value of the first timing change rate range as the second uplink timing change rate.

Optionally, the first timing change rate range is obtained by using the methods in the third aspect.

With reference to the fourth aspect, in some implementations of the fourth aspect, the first information is specifically used to indicate a maximum timing change rate and a minimum timing change rate of a first timing change rate range. The terminal device determines an average value of the maximum timing change rate and the minimum timing change rate as the second uplink timing change rate.

Optionally, the maximum timing change rate and the minimum timing change rate are obtained by using the methods in the third aspect.

With reference to the fourth aspect, in some implementations of the fourth aspect, when the first information is specifically used to indicate the first uplink timing change rate determined by the satellite based on the first uplink timing change rate range, the terminal device determines, based on the first uplink timing change rate, the second uplink timing change rate used for uplink communication.

Optionally, the first uplink timing change rate is directly determined as the second uplink timing change rate.

The terminal device directly determines an uplink timing change rate based on the first timing change rate range determined by the satellite, performs uplink communication based on the uplink timing change rate, and does not need to measure a downlink timing change rate. This is especially applicable to a common low-power terminal device such as a cellular-based narrowband internet of things (narrowband internet of things, NB-IoT) terminal device.

In this process, the satellite does not need to determine and send a timing change rate of each terminal device, so that a calculation time period and signaling overheads can be reduced.

In a conventional method, a timing change rate of a reference point is used as a universal timing change rate in a beam. In comparison, in the technical solution in this application, that the average value of the first timing change rate range is determined as the first uplink timing change rate is equivalent to optimizing selection of the reference point to select a more appropriate reference point, so that a large error when the terminal device is relatively far from the reference point can be reduced to some extent.

According to a fifth aspect, this application provides a method for determining a measurement time period for a downlink timing change rate. The method includes: determining a preset value, and determining, based on the preset value, duration of measuring a downlink timing change rate.

In the technical solution in this application, the duration of measuring the downlink timing change rate is controlled by setting the preset value, so that random access can be initiated and a random access delay can be reduced as soon as possible on the premise of ensuring that a precision requirement is satisfied.

With reference to the fifth aspect, in some implementations of the fifth aspect, a terminal device measures the downlink timing change rate within a first time period, where a length of the first time period is less than or equal to a first preset value, the first preset value is determined by using a first minimum measurement time period, the first minimum measurement time period is a minimum measurement time period shared by terminal devices, and the minimum measurement time period is a shortest time period required by the terminal device to measure a downlink timing change rate that satisfies the precision requirement.

With reference to the fifth aspect, in some implementations of the fifth aspect, the terminal device receives second information, where the second information can indicate the first preset value.

With reference to the fifth aspect, in some implementations of the fifth aspect, the first minimum measurement time period is determined based on the minimum value of the first timing change rate range in the first aspect to the third aspect.

With reference to the fifth aspect, in some implementations of the fifth aspect, a first minimum measurement time period corresponding to a first beam is determined based on a second mapping relationship, where the second mapping relationship is used to indicate a first minimum measurement time period corresponding to each of a plurality of beams including the first beam. The first minimum measurement time period corresponding to the first beam is determined as the first preset value.

With reference to the fifth aspect, in some implementations of the fifth aspect, the terminal device receives second information, where the second information can indicate a second identifier. The terminal device determines the length of the first time period based on the second identifier and a mapping relationship between the second identifier and the preset value.

With reference to the fifth aspect, in some implementations of the fifth aspect, a satellite determines the first minimum measurement time period based on a minimum timing change rate, and determines the first preset value based on the first minimum measurement time period.

The foregoing implementations can ensure that all terminal devices in a beam can measure, within duration of the first preset value, the downlink timing change rate that satisfies the precision requirement. Because the satellite needs to obtain the minimum timing change rate in all the communication methods in the third aspect, the satellite determines the first preset value based on the minimum timing change rate, to reduce an execution process and accelerate a decision.

The first minimum measurement time period is a minimum measurement time period shared by all the terminal devices in the beam, and all the terminal devices in the beam can measure, within the minimum measurement time period, the downlink timing change rate that satisfies the precision requirement. Setting only one minimum measurement time period can reduce a calculation process of the satellite, and can also reduce complexity of the mapping relationship and required storage space.

With reference to the fifth aspect, in some implementations of the fifth aspect, the terminal device measures the downlink timing change rate within the first time period, where the length of the first time period is less than or equal to a second preset value, the second preset value is determined based on a second minimum measurement time period, the second minimum measurement time period is determined based on a timing change rate specific to the terminal device, and the second minimum measurement time period is a minimum measurement time period specific to each terminal device.

A higher timing change rate in a beam indicates a shorter time period required to measure a downlink timing change rate that satisfies the precision requirement. Therefore, in a same beam, a minimum measurement time period required by a terminal device corresponding to a minimum timing change rate is longest. Therefore, the second minimum measurement time period is not longer than the first minimum measurement time period.

The second minimum measurement time period is the minimum measurement time period specific to each terminal device. Therefore, separately controlling a measurement time period of the terminal device by using the second preset value has higher control precision.

With reference to the fifth aspect, in some implementations of the fifth aspect, the terminal device determines the first preset value as the first time period, and measures the downlink timing change rate within the first time period.

A length of a measurement time period is controlled by using the first preset value. Because the minimum measurement time period of each terminal device does not need to be determined, a calculation amount of the satellite can be reduced, and complexity of the mapping relationship and the required storage space can be reduced.

With reference to the fifth aspect, in some implementations of the fifth aspect, the terminal device determines the second preset value as the first time period, and measures the downlink timing change rate within the first time period.

The length of the measurement time period is controlled by using the second preset value. Different terminal devices can be controlled, and control precision is higher.

Controlling the length of the measurement time period by using a preset value can shorten a measurement time period on the premise of ensuring the precision requirement.

With reference to the fifth aspect, in some implementations of the fifth aspect, random access is initiated after an actual measurement time period reaches the length of the first time period.

According to the foregoing method, random access is actively initiated, that is, random access is initiated immediately after measurement is completed, so that a moment of subsequent random access is advanced, and a delay of random access can be reduced.

According to a sixth aspect, this application provides a communication apparatus. The communication apparatus has a function of implementing the method according to any one of the first aspect or the possible implementations of the first aspect, and/or has a function of implementing the method according to any one of the fifth aspect or the possible implementations of the fifth aspect. Specifically, the communication apparatus includes units for implementing the method according to any one of the first aspect or the possible implementations of the first aspect, and/or units for implementing the method according to any one of the fifth aspect or the possible implementations of the fifth aspect.

According to a seventh aspect, this application provides a communication apparatus. The communication apparatus has a function of implementing the method according to any one of the second aspect or the possible implementations of the second aspect, and/or has a function of implementing the method according to any one of the fifth aspect or the possible implementations of the fifth aspect. Specifically, the communication apparatus includes units for implementing the method according to any one of the second aspect or the possible implementations of the second aspect, and/or units for implementing the method according to any one of the fifth aspect or the possible implementations of the fifth aspect.

According to an eighth aspect, this application provides a communication apparatus. The communication apparatus has a function of implementing the method according to any one of the third aspect or the possible implementations of the third aspect, and/or has a function of implementing the method according to any one of the fifth aspect or the possible implementations of the fifth aspect. Specifically, the communication apparatus includes units for implementing the method according to any one of the third aspect or the possible implementations of the third aspect, and/or units for implementing the method according to any one of the fifth aspect or the possible implementations of the fifth aspect.

According to a ninth aspect, this application provides a communication apparatus. The communication apparatus has a function of implementing the method according to any one of the fourth aspect or the possible implementations of the fourth aspect. Specifically, the communication apparatus includes units for implementing the method according to any one of the fourth aspect or the possible implementations of the fourth aspect.

According to a tenth aspect, this application provides a communication apparatus. The communication apparatus has a function of implementing the method according to any one of the first aspect or the possible implementations of the first aspect, and/or has a function of implementing the method according to any one of the fifth aspect or the possible implementations of the fifth aspect. The function may be implemented by using hardware, or may be implemented by the hardware running corresponding software. The hardware or the software includes one or more modules corresponding to the function.

In a possible design, when a part or all of the function is implemented by using the software, the communication apparatus includes: a memory, configured to store a computer program, and a processor, configured to invoke and run the program stored in the memory. When the program is run, the communication apparatus can implement the method according to any one of the first aspect or the possible implementations of the first aspect, and/or the method according to any one of the fifth aspect or the possible implementations of the fifth aspect.

In a possible design, when a part or all of the function is implemented by using the software, the communication apparatus includes a processor. A memory configured to store a program is located outside the communication apparatus. The processor is connected to the memory by using a circuit/wire, and is configured to read and run the program stored in the memory.

In a possible design, when a part or all of the function is implemented by using hardware, the communication apparatus includes an input interface circuit, a logic circuit, and an output interface circuit. The input interface circuit is configured to receive first information. The logic circuit is configured to obtain a first downlink timing change rate and determine a first uplink timing change rate. The output interface circuit is configured to output the first uplink timing change rate.

Optionally, the input interface circuit is configured to receive second information. The logic circuit is configured to determine a preset value of a measurement time period. The output interface circuit is configured to output the preset value.

According to an eleventh aspect, this application provides a communication apparatus. The communication apparatus has a function of implementing the method according to any one of the second aspect or the possible implementations of the second aspect, and/or has a function of implementing the method according to any one of the fifth aspect or the possible implementations of the fifth aspect. The function may be implemented by using hardware, or may be implemented by the hardware running corresponding software. The hardware or the software includes one or more modules corresponding to the function.

In a possible design, when a part or all of the function is implemented by using the software, the communication apparatus includes: a memory, configured to store a computer program; and a processor, configured to invoke and run the program stored in the memory. When the program is run, the communication apparatus can implement the method according to any one of the second aspect or the possible implementations of the second aspect, and/or the method according to any one of the fifth aspect or the possible implementations of the fifth aspect.

In a possible design, when a part or all of the function is implemented by using the software, the communication apparatus includes a processor. A memory configured to store a program is located outside the communication apparatus. The processor is connected to the memory by using a circuit/wire, and is configured to read and run the program stored in the memory.

In a possible design, when a part or all of the function is implemented by using hardware, the communication apparatus includes an input interface circuit, a logic circuit, and an output interface circuit. The input interface circuit is configured to receive first information. The logic circuit is configured to obtain a first downlink timing change rate and determine a first uplink timing change rate. The output interface circuit is configured to output the first uplink timing change rate.

Optionally, the input interface circuit is configured to receive second information. The logic circuit is configured to determine a preset value of a measurement time period. The output interface circuit is configured to output the preset value.

According to a twelfth aspect, this application provides a communication apparatus. The communication apparatus has a function of implementing the method according to any one of the third aspect or the possible implementations of the third aspect, and/or has a function of implementing the method according to any one of the fifth aspect or the possible implementations of the fifth aspect. The function may be implemented by using hardware, or may be implemented by the hardware running corresponding software. The hardware or the software includes one or more modules corresponding to the function.

In a possible design, when a part or all of the function is implemented by using the software, the communication apparatus includes: a memory, configured to store a program; and a processor, configured to invoke and run the program stored in the memory. When the program is run, the communication apparatus can implement the method according to any one of the third aspect or the possible implementations of the third aspect, and/or the method according to any one of the fifth aspect or the possible implementations of the fifth aspect.

In a possible design, when a part or all of the function is implemented by using the software, the communication apparatus includes a processor. A memory configured to store a program is located outside the communication apparatus. The processor is connected to the memory by using a circuit/wire, and is configured to read and run the program stored in the memory.

In a possible design, when a part or all of the function is implemented by using hardware, the communication apparatus includes an input interface circuit, a logic circuit, and an output interface circuit. The input interface circuit is configured to receive a satellite status parameter. The logic circuit is configured to determine a first timing change rate range based on the satellite status parameter. The output interface circuit is configured to output the first timing change rate range.

Optionally, the logic circuit is configured to determine a preset value. The output interface circuit is configured to output indication information of the preset value.

According to a thirteenth aspect, this application provides a communication apparatus. The communication apparatus has a function of implementing the method in implementations of the fourth aspect. The function may be implemented by using hardware, or may be implemented by the hardware running corresponding software. The hardware or the software includes one or more modules corresponding to the function.

In a possible design, when a part or all of the function is implemented by using the software, the communication apparatus includes: a memory, configured to store a program; and a processor, configured to invoke and run the program stored in the memory. When the program is run, the communication apparatus can implement the method according to any one of the fourth aspect or the possible implementations of the fourth aspect.

In a possible design, when a part or all of the function is implemented by using the software, the communication apparatus includes a processor. A memory configured to store a program is located outside the communication apparatus. The processor is connected to the memory by using a circuit/wire, and is configured to read and run the program stored in the memory.

In a possible design, when a part or all of the function is implemented by using hardware, the communication apparatus includes an input interface circuit, a logic circuit, and an output interface circuit. The input interface circuit is configured to receive first information. The logic circuit is configured to determine a first uplink timing change rate based on the first information. The output interface circuit is configured to output the first uplink timing change rate.

According to a fourteenth aspect, this application provides a computer-readable storage medium. The computer-readable storage medium stores computer instructions. When the computer instructions are run on a computer, the computer is enabled to perform the method according to any one of the first aspect to the fifth aspect or the possible implementations of the first aspect to the fifth aspect.

According to a fifteenth aspect, this application provides a chip, including a processor. The processor is configured to read and execute a computer program stored in a memory, to perform the method according to any one of the first aspect to the fifth aspect or the possible implementations of the first aspect to the fifth aspect.

Optionally, the chip further includes the memory, and the processor is connected to the memory by using a circuit or a wire.

Further, optionally, the chip further includes a communication interface.

According to a sixteenth aspect, this application provides a computer program product. The computer program product includes computer program code. When the computer program code is run on a computer, the computer is enabled to perform the method according to any one of the first aspect to the fifth aspect or the possible implementations of the first aspect to the fifth aspect.

DESCRIPTION OF EMBODIMENTS

The following describes technical solutions in this application with reference to accompanying drawings.

The technical solutions in embodiments of this application may be applied to communication systems such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system and a future evolved network thereof, a new radio (NR) system, or a satellite communication system.

Figure 1:
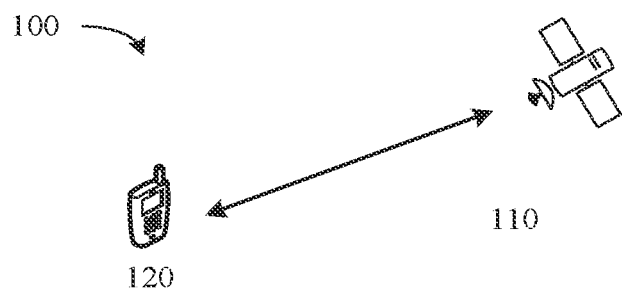
FIG. 1 is a schematic diagram of an architecture of a communication system used in an embodiment of this application.

For ease of understanding of the embodiments of this application, first, a communication system used in the embodiments of this application is described in detail with reference to FIG. 1. FIG. 1 is a schematic diagram of an architecture of a communication system used in an embodiment of this application. As shown in FIG. 1, the communication system 100 may include at least one network device, for example, a network device 110 shown in FIG. 1. The communication system 100 may further include at least one terminal device, for example, a terminal device 120 shown in FIG. 1. The network device 110 may communicate with the terminal device 120 through a radio link.

It should be understood that the network device in the wireless communication system may be any device that has a wireless transceiver function. The device includes but is not limited to a base station controller (BSC), a base transceiver station (BTS), or the like, may be one antenna panel or one group (including a plurality of antenna panels) of antenna panels of a base station in a 5G system or the like, or may be a satellite or the like.

It should be understood that the terminal device and UE may also be referred to as an access terminal device, a subscriber unit, a subscriber station, a mobile station, a remote station, a remote terminal device, a mobile device, a user terminal device, a terminal device, a wireless communication device, a user agent, or a user apparatus. UE in the embodiments of this application may be a mobile phone, a smart watch, a tablet (pad), a computer having the wireless transceiver function, a virtual reality (VR) terminal device, an augmented reality (AR) terminal device, a wireless terminal device in industrial control, a wireless terminal device in self driving, a wireless terminal device in telemedicine, a wireless terminal device in a smart grid, a wireless terminal device in transportation safety, a wireless terminal device in a smart city, a wireless terminal device in a smart home, or the like. An application scenario is not limited in the embodiments of this application.

The following describes in detail the technical solutions in this application by using a satellite communication system as an example.

The satellite communication system may include at least one satellite communication device, for example, network device 110 shown in FIG. 1, that may be, for example, a satellite. The satellite communication system may further include at least one terminal device such as 120 shown in FIG. 1.

Figure 2:
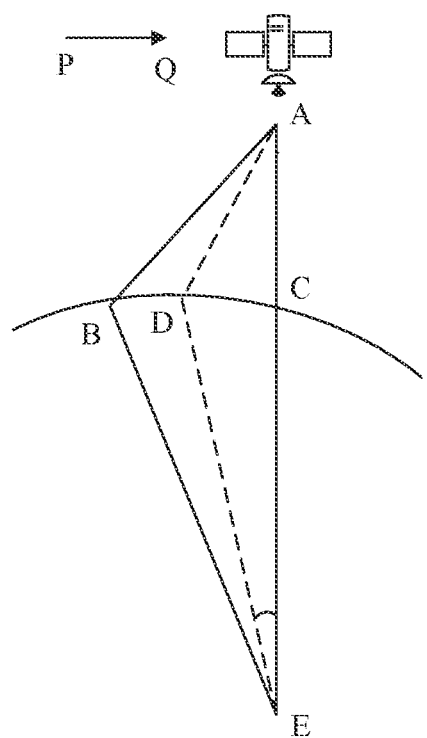
FIG. 2 is a schematic diagram of a satellite status according to an embodiment of this application.

For ease of understanding of the embodiments of this application, the following describes a status parameter of the satellite in detail with reference to FIG. 2.

The status parameter of the satellite may be understood as a parameter that can reflect a status of the satellite in a time dimension and a spatial dimension such as a height or a velocity at a moment.

FIG. 2 is a schematic diagram of a satellite status according to an embodiment of this application. As shown in FIG. 2, A is a location of a satellite at a first moment, B and D are ground observation points, and an arc on which B, C and D are located is the horizon, E is the center of the earth, C is located directly below A, is an intersection point of a connection line AE of the satellite and the center of the earth and the horizon BD, and is referred to as a sub-satellite point.

An included angle between BA and BC is γ1, an included angle between DA and DC is γ2, and both are referred to as elevation angles.

An included angle between AB and AC is β1, an included angle between AD and AC is β2, and both are referred to as half viewing angles.

An included angle between EB and EC is α1, and an included angle between ED and EC is α2, and both are referred to as geocentric angles.

A length of a distance between A and C is h, which indicates a satellite height. A distance between E and B, a distance between E and C, and a distance between E and D are all earth radii $r_E$.

A direction PQ indicates a motion direction of the satellite at a current moment, and a corresponding motion velocity is an angular velocity ω.

It should be understood that the satellite status includes but is not limited to the status shown in FIG. 2.

Figure 3:
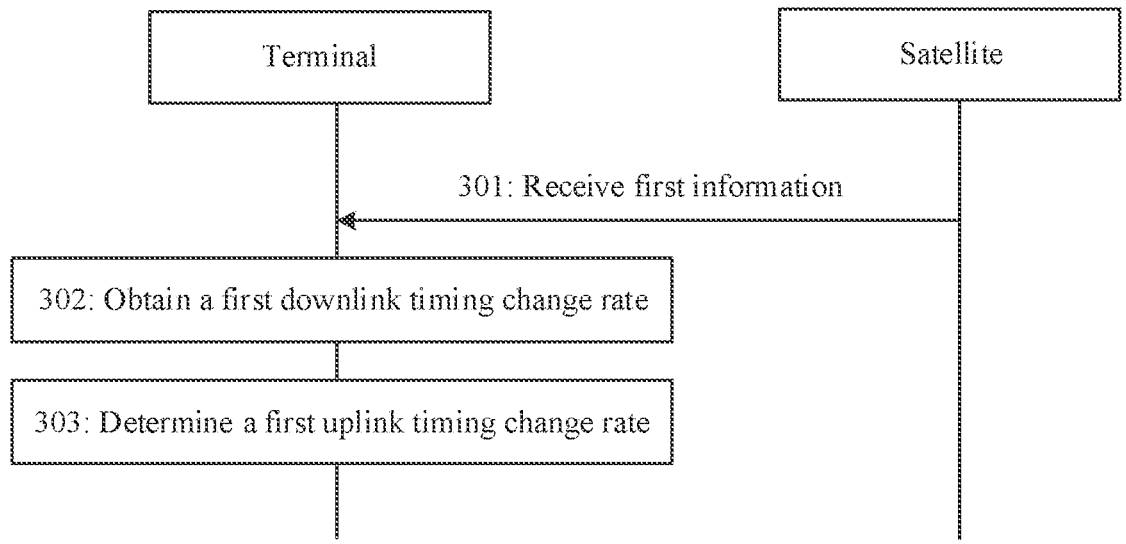
FIG. 3 is a schematic diagram of determining an uplink communication method according to an embodiment of this application.

FIG. 3 is a schematic diagram of determining an uplink communication method according to an embodiment of this application. The following describes in detail a procedure of the method with reference to FIG. 3.

301: Receive first information.

In an implementation, the first information may indicate a first timing change rate range. It should be understood that the indication may be implemented in different manners.

In an example, the first information includes a maximum timing change rate and a minimum timing change rate. Therefore, after receiving the first information, the terminal device can directly determine the first timing change rate range based on the maximum timing change rate and the minimum timing change rate.

In another example, the first information includes an indication that may be used to determine the maximum timing change rate and the minimum timing change rate, for example, may be a multiple of the maximum timing change rate and the minimum timing change rate. Therefore, after receiving the first information, the terminal device can determine the first timing change rate range through conversion.

In another example, the first timing change rates are discontinuous. Therefore, the first timing change rates range is a discontinuous set including discontinuous first timing change rates, and the first information includes an indication of each first timing change rate in the discontinuous set. Therefore, after receiving the first information, the terminal device can determine the first timing change rate range.

In still another example, the first information can indicate a second timing change rate Rate2. Therefore, after receiving the first information, the terminal device determines the first timing change rate range as [Rate2−Δ1, Rate2+Δ2], where Δ1 and Δ2 represent offsets of the timing change rate Rate2, and the offsets are real numbers.

In this example, Δ1 and Δ2 may be stored in the terminal device. After receiving the first information that can indicate Rate2, the terminal device may invoke Δ1 and Δ2 to determine the first timing change rate range.

In this example, the first information may further include an indication of Rate2, Δ1, and Δ2. Therefore, after receiving the first information, the terminal device can directly determine the first timing change rate range as [Rate2-Δ1, Rate2+Δ2].

In still another example, a mapping relationship between both Δ1 and Δ2 and Rate2 may be further pre-established. After receiving the first information that can indicate Rate2, the terminal device may determine the first timing change rate range by using the mapping relationship based on a value of Rate2. A person skilled in the art may further think of another method for determining the first timing change rate range by using Rate2. Details are not described herein again.

In this example, the second timing change rate may be obtained by a satellite through calculation, a timing change rate of a terminal device with a minimum transmission delay in a beam may be determined as the second timing change rate, or a timing change rate of a terminal device closest to the satellite may be determined as the second timing change rate. A person skilled in the art may obtain the second timing change rate by using the foregoing example method, or may obtain the second timing change rate by using another similar or similar method. Details are not described herein again.

In still another example, the first information includes a beam identifier (identifier, ID) of a first beam. The first beam is a beam used by the terminal device to perform uplink communication. The terminal device may determine, as the first timing change rate range based on a first mapping relationship, a preset range corresponding to the first beam, where the first mapping relationship is used to indicate a preset range corresponding to each of a plurality of beams including the first beam.

In this example, corresponding timing change rate ranges are first preset for different beams, and a mapping relationship between beam IDs and preset timing change rate ranges is established. After a beam ID is determined, a corresponding preset timing change rate range is determined as the first timing change rate range by using the mapping relationship.

It should be understood that the mapping relationship may be a one-to-one mapping relationship, or may be a many-to-one mapping relationship. For example, a plurality of beam IDs may correspond to one preset range, and the preset range may be determined as the first timing change rate range of the plurality of beam IDs.

It should be understood that the first timing change rate range may be expressed in different manners, but may finally be equivalent to a range interval including the minimum timing change rate and the maximum timing change rate. All substantially the same representation manners fall within the protection scope of this application.

In an example, the first timing change rate range is represented as [Min, Max]. In this case, Min corresponds to the minimum timing change rate in the first timing change rate range, and Max corresponds to the maximum timing change rate in the first timing change rate range.

It should be understood that the first timing change rate range may not include a boundary value. For example, the first timing change rate range may be an interval (Min, Max), (Min, Max], or [Min, Max). For another example, the timing change rate range may be (0, Max], [Min, +∞), or the like.

In another example, the first timing change rate range is represented as [Rate3−Δ3, Rate3+Δ4]. In this case, Rate3−Δ3 corresponds to the minimum timing change rate in the first timing change rate range, and Rate3+Δ4 corresponds to the maximum timing change rate in the first timing change rate range.

It is assumed that Rate3=Min. In this case, when Δ3=0, and Δ4=Max-Min, the range [Rate3−Δ3, Rate3+Δ4] is equivalent to the range [Min, Max] in the previous example.

It should be understood that values of Rate3, Δ3, and Δ4 are not limited, provided that a relationship formed by Rate3, Δ3, and Δ4 can represent the range. An extreme case is used for description. Assuming that the timing change rate Rate3 is much greater than Max, that Δ3=Rate3−Min and Δ4=Max−Rate3 may be set, so that the range [Rate3−Δ3, Rate3+Δ4] can still be equivalent to the range [Min, Max].

It should be noted that although Rate3 may not fall within the range [Min, Max], for ease of representation, preferably, a value within the range [Min, Max] is determined as Rate3.

302: Obtain a first downlink timing change rate.

In an implementation, a downlink timing change rate may be measured by using the following method. It is assumed that a timing change periodicity is $T_c$. A quantity of timing change points within a period of time t is counted as N. The downlink timing change rate is obtained by calculating $T_c*N/t$.

It should be understood that the foregoing method is merely an example. A person skilled in the art may alternatively measure and obtain the downlink timing change rate by using another conventional rate measurement method. This is not limited herein, and details are not described herein again.

In another implementation, the downlink timing change rate may be continuously measured. For example, a measurement periodicity may be set to continuously and periodically measure the downlink timing change rate.

In still another implementation, to obtain higher precision, iteration may be further performed on the downlink timing change rate. When a value of a downlink timing change rate at a current moment is to be determined, a value of a downlink timing change rate at a previous moment and an actual measurement value at the current moment are comprehensively considered, the actual measurement value at the current moment is adjusted, and an adjusted value is determined as a first downlink timing change rate at the current moment.

Precision of the downlink timing change rate can be improved by comprehensively considering measurement data at the current moment and historical data.

In an example, the terminal device may further introduce a weighting coefficient, set different weights of downlink timing change rates at different moments, and adjust, by using the weights when iteration is performed on the downlink timing change rate, impact of the downlink timing change rates at the different moments on a final result, so that the precision of the downlink timing change rate can be further improved.

For example, a weight of a downlink timing change rate closest to the current moment may be increased, and/or a weight of a downlink timing change rate farther from the current moment may be decreased.

303: Determine a first uplink timing change rate.

It should be understood that the first timing change rate range in this application may be a range of the downlink timing change rate, or may be a range of an uplink timing change rate. For differentiation and understanding, in the following description, when the first timing change rate range corresponds to the downlink timing change rate, the first timing change rate range is referred to as a first downlink timing change rate range; when the first timing change rate range corresponds to the uplink timing change rate, the first timing change rate range is referred to as a first uplink timing change rate range.

In an implementation, after obtaining the first downlink timing change rate, the terminal device determines a second uplink timing change rate corresponding to the first downlink timing change rate, and then determines the first uplink timing change rate based on a relationship between the second uplink timing change rate and the first uplink timing change rate range.

In this implementation, after obtaining the first downlink timing change rate, the terminal device first determines the second uplink timing change rate corresponding to the first downlink timing change rate.

Optionally, the second uplink timing change rate is twice the first downlink timing change rate.

In this implementation, after determining the second uplink timing change rate, the terminal device determines whether the second uplink timing change rate falls within the first uplink timing change rate range, and determines the first uplink timing change rate based on a determining result.

In an example, after receiving the first information in 301, the terminal device determines the first uplink timing change rate range as [Min1, Max1] according to an indication of the first uplink timing change rate range, where Min1 is a minimum value of the first uplink timing change rate range, and Max1 is a maximum value of the first uplink timing change rate range. It should be understood that, as described in 301, although the range is represented in different manners, the range may be equivalent to the first uplink timing change rate range [Min1, Max1].

The terminal device determines whether the second uplink timing change rate falls within the first uplink timing change rate range.

When the second uplink timing change rate falls within the first uplink timing change rate range, the second uplink timing change rate is determined as the first uplink timing change rate.

When the second uplink timing change rate is greater than the maximum value Max1 of the first uplink timing change rate range, the maximum value Max1 is determined as the first uplink timing change rate.

When the second uplink timing change rate is less than the minimum value Min1 of the first uplink timing change rate range, the minimum value Min1 is determined as the first uplink timing change rate.

The terminal device performs uplink communication with the satellite based on the first uplink timing change rate.

In another implementation, after obtaining the first downlink timing change rate, the terminal device determines a second downlink timing change rate based on a relationship between the first downlink timing change rate and the first downlink timing change rate range, and then determines the first uplink timing change rate based on a correspondence between the second downlink timing change rate and the first uplink timing change rate.

In this implementation, after determining the first downlink timing change rate, the terminal device determines whether the first downlink timing change rate falls within the first downlink timing change rate range, and determines the second uplink timing change rate based on a determining result.

In an example, after receiving the first information in 301, the terminal device determines the first downlink timing change rate range as [Min2, Max2] according to an indication of the first downlink timing change rate range, where Min2 is a minimum value of the first downlink timing change rate range, and Max2 is a maximum value of the first downlink timing change rate range. It should be understood that, as described in 301, although the range is represented in different manners, the range may be equivalent to the first downlink timing change rate range [Min2, Max2].

The terminal device determines whether the first downlink timing change rate falls within the first downlink timing change rate range.

When the first downlink timing change rate falls within the first downlink timing change rate range, the first downlink timing change rate is determined as the second uplink timing change rate.

When the first downlink timing change rate is greater than the maximum value Max2 of the first downlink timing change rate range, the maximum value Max2 is determined as the second uplink timing change rate.

When the first downlink timing change rate is less than the minimum value Min2 of the first downlink timing change rate range, the minimum value Min2 is determined as the second uplink timing change rate.

After determining the second uplink timing change rate, the terminal device determines the first uplink timing change rate based on the second downlink timing change rate.

Optionally, the first uplink timing change rate is twice the second downlink timing change rate.

The terminal device performs uplink communication with the satellite based on the first uplink timing change rate.

In the foregoing implementation, when the first uplink timing change rate is determined, the first downlink timing change rate measured by the terminal device and the first timing change rate range determined by using the received first information sent by the satellite are comprehensively considered. Precision is higher, and a better uplink timing change rate can be obtained. Therefore, correction of uplink timing drift can be more accurate.

It should be understood that, in this embodiment of this application, a sequence of performing steps 301 to 303 is not limited, and the foregoing sequence may be used, or another sequence may be used.

The terminal device measures the downlink timing change rate, to obtain measurement data having higher precision. Therefore, the first uplink timing change rate determined based on the measurement data also has higher precision. The terminal device determines the first uplink timing change rate based on the first timing change rate range determined by using the first information sent by the satellite, so that correction of the uplink timing drift can be more accurate. In a conventional measurement method, the satellite sends a common uplink timing change rate to all UE in the beam, and UE corresponding to the common uplink timing change rate is referred to as reference point UE. When actual UE is farther from the reference point UE, there is still a quite large error of adjustment performed by using the common uplink timing change rate. Compared with the conventional measurement method, the method in this embodiment of this application can effectively eliminate uplink timing drift of the actual UE regardless of a distance between the actual UE and the reference point UE, and have higher adjustment precision.

In another conventional measurement method, the satellite calculates and delivers, based on a timing change rate uploaded by UE, an uplink timing change rate that satisfies a precision requirement. This requires a longer calculation time period, and increases signaling overheads. Compared with the conventional measurement method, this embodiment of this application does not need to separately calculate and send an uplink timing change rate that satisfies the precision requirement and that is of each UE, so that a calculation time period of the satellite can be effectively reduced, signaling overheads can be reduced, and measurement precision used by the UE to measure the timing change rate is higher. Therefore, in this embodiment of this application, a problem of the uplink timing drift can be better resolved, and uplink performance can be improved.

Figure 4:
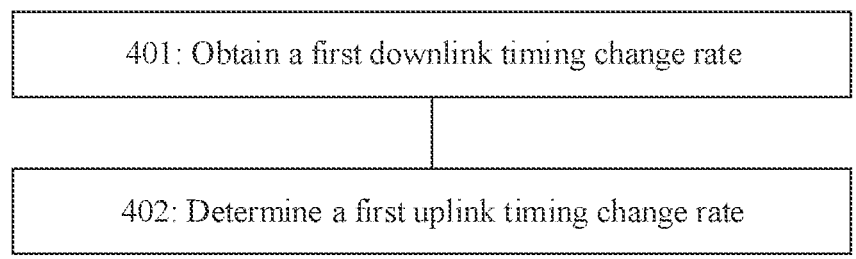
FIG. 4 is another schematic diagram of determining an uplink communication method according to an embodiment of this application.

FIG. 4 is another schematic diagram of determining an uplink communication method according to an embodiment of this application. The following describes in detail a procedure of the method with reference to FIG. 4.

401: Obtain a first downlink timing change rate.

In an implementation, the first downlink timing change rate may be obtained by using the methods in step 302.

402: Determine a first uplink timing change rate.

In an implementation, after obtaining the first downlink timing change rate, a terminal device determines the first uplink timing change rate based on the first downlink timing change rate. The terminal device performs uplink communication with a satellite based on the first uplink timing change rate.

Optionally, the first uplink timing change rate is twice the first downlink timing change rate.

The terminal device adjusts an uplink timing location in a TA update periodicity by using the foregoing method, so that uplink timing drift can be effectively reduced, uplink performance can be improved, and uplink communication with the satellite can be improved.

In another implementation, a first determining condition is set, and the first uplink timing change rate is determined based on the first downlink timing change rate when the first downlink timing change rate satisfies the first determining condition.

Data that does not satisfy a determining condition can be excluded by setting the determining condition, to improve precision.

In still another implementation, a first determining condition is set, and the first uplink timing change rate is determined by using another parameter when the first downlink timing change rate does not satisfy the first determining condition. For example, a preset value of a specific timing change rate may be determined as a value of the first uplink timing change rate.

Bad data is corrected by introducing the another parameter, and is not directly discarded, to further improve the precision.

Optionally, the first determining condition may be a numerical range, and it is assumed that the first determining condition may be equivalent to a range [Min3, Max3]. Min3 and Max3 respectively correspond to a minimum value and a maximum value of the numerical range.

Optionally, when the first downlink timing change rate is greater than Max3, the first uplink timing change rate is determined by using Max3. When the first downlink timing change rate is less than Min3, the first uplink timing change rate is determined by using Min3.

It should be understood that the range may not include the maximum value Max3 and the minimum value Min3, and the range may be an open interval or a closed interval. Max3 may alternatively be infinite. In this case, it is equivalent to considering only the parameter Min3.

It is assumed that a timing change rate range [Min4, Max4] is determined based on a minimum timing change rate Min4 and a maximum timing change rate Max4 in a beam, and is referred to as a fourth range, and the range [Min3, Max3] of the first determining condition is referred to as a third range. The following describes in detail a possible case in which the first uplink timing change rate is determined by using the another parameter.

When Min3≤Min4, and Max3≤Max4, timing change rates greater than Max3 in the beam do not satisfy the first determining condition, and for the timing change rates that do not satisfy the first determining condition, the first uplink timing change rate needs to be determined by using the another parameter.

When Min3≤Min4, and Max3>Max4, all timing change rates in the beam satisfy the first determining condition, and therefore, the another parameter does not need to be used.

When Min3>Min4, and Max3≤Max4, neither a timing change rate less than Min3 nor a timing change rate greater than Max3 in the beam satisfies the first determining condition, and for the timing change rates that do not satisfy the first determining condition, the first uplink timing change rate needs to be determined by using the another parameter.

When Min3>Min4, and Max3>Max4, timing change rates less than Min3 in the beam do not satisfy the first determining condition, and for the timing change rates that do not satisfy the first determining condition, the first uplink timing change rate needs to be determined by using the another parameter.

Preferably, Min3 and Max3 correspond to the minimum timing change rate and the maximum timing change rate in the beam. That is, the third range is equivalent to the fourth range.

The terminal device introduces a determining condition, uses the first downlink timing change rate when the determining condition is satisfied, and performs correction by using the another parameter when the determining condition is not satisfied. According to the foregoing method, when an error of the first downlink timing change rate is excessively large or the data is excessively bad, modification can be performed by using the another parameter, to reduce impact of bad data, better resolve a problem of the uplink timing drift, improve uplink performance, and improve uplink communication with the satellite.

Figure 5:
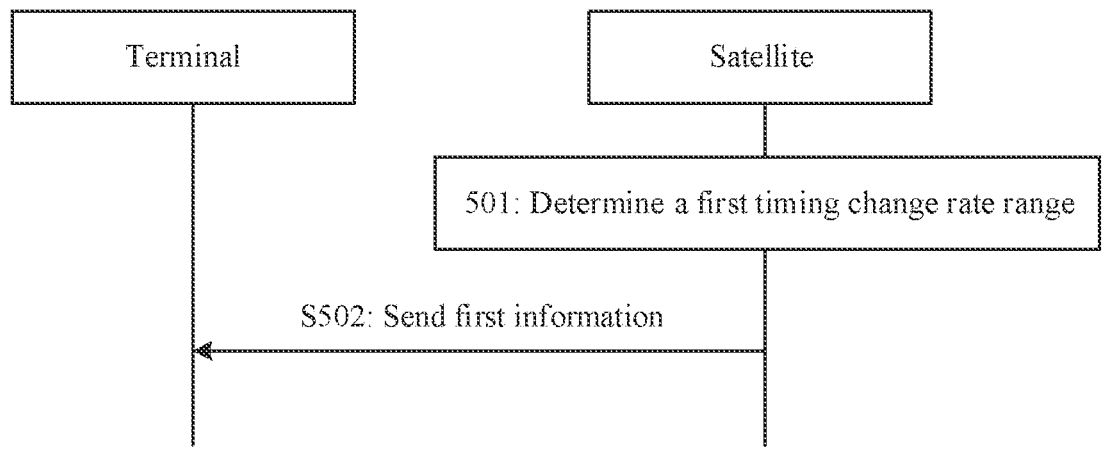
FIG. 5 is a schematic diagram of a downlink communication method according to an embodiment of this application.

FIG. 5 is a schematic diagram of a downlink communication method according to an embodiment of this application. The following describes in detail a procedure of the method with reference to FIG. 5.

501: Determine a first timing change rate range.

In an implementation, a satellite obtains a maximum timing change rate and a minimum timing change rate, and determines the first timing change rate range based on the maximum timing change rate and the minimum timing change rate.

In an example, the satellite obtains a second maximum timing change rate Max and a second minimum timing change rate Min in a TA update periodicity of each beam, and obtains Max and Min by using the following formula:

$$\text{Rate} = \frac{2}{c} \times \frac{\omega r_E (r_E + h) \sin \alpha}{\sqrt{r_E^2 + (r_E + h)^2 - 2 r_E (r_E + h) \cos \alpha}}.$$

Rate is a timing change rate in the TA update periodicity, $\alpha$ is a geocentric angle, c is a velocity of light, $r_E$ is a radius of the earth, h is a satellite height, and $\omega$ is a satellite angular velocity.

It should be understood that the foregoing formula is merely an example of this embodiment of this application, and is not equivalent to the protection scope of this application. A person skilled in the art may slightly modify the formula or apply another appropriate existing formula to this embodiment of this application without creative efforts, to obtain Max and Min.

A satellite status parameter is obtained, and Max and Min are obtained based on the foregoing formula and the satellite status parameter.

It should be noted that, that a satellite status parameter is obtained may be that all or some parameters of statuses such as the satellite height, the geocentric angle, and the satellite angular velocity are obtained, or may be that a parameter that can represent another status of the satellite in a time dimension and a spatial dimension is obtained. This depends on a specific situation, and is not limited herein.

It should be understood that Max and Min obtained above may alternatively not be directly obtained through calculation by using the formula. For example, a person skilled in the art may further determine, as Max and Min, values close to a maximum value and a minimum value that can be obtained by using the formula, for example, determine a value slightly greater than the maximum value as Max, and determine a value slightly less than the minimum value as Min, so that a similar technical effect can also be achieved.

Optionally, Max is determined as the maximum timing change rate, and Min is determined as the minimum timing change rate.

In another example, the maximum timing change rate and the minimum timing change rate may alternatively be determined by determining a third timing change rate.

Optionally, the third timing change rate may be obtained by using the foregoing formula.

Optionally, a timing change rate of a terminal device with a minimum transmission delay is determined as the third timing change rate.

Optionally, a timing change rate of a terminal device closest to the satellite is determined as the third timing change rate.

Optionally, assuming that a value of the third timing change rate is Rate3, Rate3+$\Delta$4 and Rate3−$\Delta$3 are respectively determined as the maximum timing change rate and the minimum timing change rate, where $\Delta$3 and $\Delta$4 represent downward and upward offsets of the specified third timing change rate, and the offsets are real numbers.

It should be noted that a person skilled in the art may further determine the third timing change rate by collecting statistics on historical data of a timing change rate. Details are not described herein again.

In still another example, a preset range corresponding to a first beam is determined as the first timing change rate range based on a first mapping relationship, where the first mapping relationship is used to indicate a preset range corresponding to each of a plurality of beams including the first beam.

In this example, corresponding timing change rate ranges are preset for different beams, and a mapping relationship between beam IDs and preset timing change rate ranges is established. After a beam ID is determined, a corresponding preset timing change rate range is determined as the first timing change rate range by using the mapping relationship.

It should be understood that the mapping relationship may be a one-to-one mapping relationship, or may be a many-to-one mapping relationship. For example, a plurality of beam IDs may correspond to one preset range, and the preset range may be determined as the first timing change rate range.

It should be understood that the first timing change rate range in this application may be a range of a downlink timing change rate, or may be a range of an uplink timing change rate. When the first timing change rate range corresponds to the downlink timing change rate, the first timing change rate range is referred to as a first downlink timing change rate range; when the first timing change rate range corresponds to the uplink timing change rate, the first timing change rate range is referred to as a first uplink timing change rate range. This corresponds to step 303.

502: Send first information.

In an implementation, the satellite sends the first information to a terminal device, where the first information is used to indicate the first timing change rate range. It should be understood that the indication may be implemented in different manners.

In an example, the first information includes the maximum timing change rate in the first timing change rate range and the minimum timing change rate in the first timing change rate range. Therefore, after receiving the first information, the terminal device can directly determine the first timing change rate range based on the maximum timing change rate in the first timing change rate range and the minimum timing change rate in the first timing change rate range.

In another example, the first information includes an indication that may be used to determine the maximum timing change rate in the first timing change rate range and the minimum timing change rate in the first timing change rate range, for example, may be a multiple of the maximum timing change rate and the minimum timing change rate. Therefore, after receiving the first information, the terminal device can determine the first timing change rate range through conversion.

In another example, the first timing change rates are discontinuous. Therefore, the first timing change rates range is a discontinuous set including discontinuous first timing change rates, and the first information includes an indication of each first timing change rate in the discontinuous set. Therefore, after receiving the first information, the terminal device can determine the first timing change rate range.

In still another example, the first information can indicate a second timing change rate Rate2. Therefore, after receiving the first information, the terminal device can determine the first timing change rate range as [Rate2−Δ1, Rate2+Δ2] based on Rate2 and with reference to offsets Δ1 and Δ2 of Rate2, where the offsets Δ1 and Δ2 are real numbers, and are downward and upward offsets of Rate2.

In this example, Δ1 and Δ2 may be prestored in the terminal device. After receiving the first information that can indicate Rate2, the terminal device may invoke corresponding Δ1 and Δ2 to determine the first timing change rate range.

In this example, a mapping relationship between both Δ1 and Δ2 and Rate2 may be further pre-established. After receiving the first information that can indicate Rate2, the terminal device may determine the first timing change rate range based on a value of Rate2 and the mapping relationship. A person skilled in the art may further think of another method for determining the first timing change rate range by using Rate2. Details are not described herein again.

In still another example, the first information can indicate the second timing change rate Rate2 and the offsets Δ1 and Δ2. Therefore, after receiving the first information, the terminal device can directly determine the first timing change rate range as [Rate2−Δ1, Rate2+Δ2] based on the three parameters.

Optionally, Rate2 may be determined based on the maximum timing change rate and the minimum timing change rate. For example, an average value of the maximum timing change rate Max and the minimum timing change rate Min is determined as Rate2. In this case, when Δ2=Rate2−Min, the range [Rate2−Δ1, Rate2+Δ2] is equivalent to a range [Min, Max].

In addition, the timing change rate of the terminal device with the minimum transmission delay in the beam may alternatively be determined as Rate2. Alternatively, the timing change rate of the terminal device closest to the satellite is determined as Rate2. A person skilled in the art may obtain Rate2 by using the foregoing example method, or may obtain Rate2 by using another similar or approximate method. This is not described herein again.

In still another example, the first information includes a beam identifier (identifier, ID) of the first beam. The first beam is a beam used by the terminal device to perform uplink communication. The terminal device may determine, as the first timing change rate range based on the first mapping relationship, the preset range corresponding to the first beam, where the first mapping relationship is used to indicate the preset range corresponding to each of the plurality of beams including the first beam.

In this example, the corresponding timing change rate ranges are first preset for the different beams, and the mapping relationship between the beam IDs and the preset timing change rate ranges is established. After the beam ID is determined, the corresponding preset timing change rate range is determined as the first timing change rate range by using the mapping relationship.

It should be understood that the mapping relationship may be the one-to-one mapping relationship, or may be the many-to-one mapping relationship. For example, the plurality of beam IDs may correspond to the preset range, and the preset range may be determined as the first timing change rate range of the plurality of beam IDs.

It should be understood that, as described in 301, the first timing change rate range may be expressed in different manners, but may finally be equivalent to a range interval including the minimum timing change rate and the maximum timing change rate. All substantially the same representation manners fall within the protection scope of this application. Details are not described herein again.

In this embodiment of this application, the satellite sends the first information used to indicate the first timing change rate range, to assist the terminal device in determining a first uplink timing change rate and adjusting an uplink timing change location. The satellite does not need to separately calculate and send an uplink timing change rate of each terminal device, so that a calculation time period and signaling overheads can be reduced.

Because a measurement time period is required when a terminal device measures a downlink timing change rate, and the measurement time period directly impacts measurement precision, to ensure the measurement precision of the downlink timing change rate, an embodiment of this application provides a method for determining the measurement time period of the downlink timing change rate. Specific descriptions are as follows.

A higher timing change rate in a beam indicates a shorter measurement time period required to measure a downlink timing change rate that satisfies a precision requirement. Therefore, assuming that measurement precision requirements of downlink timing change rates in a same beam are the same, and a timing change rate of a first terminal device is higher than a timing change rate of a second terminal device, a measurement time period required by the first terminal device to measure the downlink timing change rate that satisfies the precision requirement is shorter than a measurement time period required by the second terminal device.

Because power consumption increases by continuously measuring the downlink timing change rate, and power consumption is expected to be reduced as much as possible for a common low-power terminal device, an embodiment of this application provides a method for determining an uplink timing change rate. The following describes the method in detail.

In an embodiment, a terminal device receives first information from a satellite, where the first information is used to indicate a first timing change rate range. The terminal device determines a first uplink timing change rate based on the first timing change rate range, and performs uplink communication based on the first uplink timing change rate.

Optionally, after receiving the first information, the terminal device determines a value in the first timing change rate range as the first uplink timing change rate.

Preferably, an average value of the first timing change rate range is determined as the first uplink timing change rate.

In an implementation, the first timing change rate range may be obtained by using the methods in step 501.

In another implementation, the first information is equivalent to the first information sent in step 502.

Optionally, the first information is used to indicate a maximum timing change rate and a minimum timing change rate in the first timing change rate range.

In still another implementation, the first information can indicate the first uplink timing change rate determined by the satellite according to the foregoing method.

In an example, after obtaining the first timing change rate range, the satellite determines the average value of the first timing change rate range as the first uplink timing change rate, and sends an indication of the first uplink timing change rate to the terminal device by using the first information.

It should be understood that another value of the first timing change rate range may alternatively be determined as the first uplink timing change rate. This is not limited or described herein.

The terminal device directly determines an uplink timing change rate based on indication information sent by the satellite, performs uplink communication based on the uplink timing change rate, and does not need to measure the downlink timing change rate. This can reduce power consumption, and is especially applicable to a common low-power terminal device such as a cellular-based narrowband internet of things (narrowband internet of things, NB-IoT) terminal device.

In this process, the satellite does not need to determine and send a timing change rate of each terminal device, so that a calculation time period and signaling overheads can be reduced.

In a conventional method, a timing change rate of a reference point is used as a universal timing change rate in a beam. In comparison, in the technical solution in this application, that the average value of the first timing change rate range is determined as the first uplink timing change rate is equivalent to optimizing selection of the reference point to select a more appropriate reference point, so that a large error when the terminal device is relatively far from the reference point can be reduced to some extent.

Figure 6:
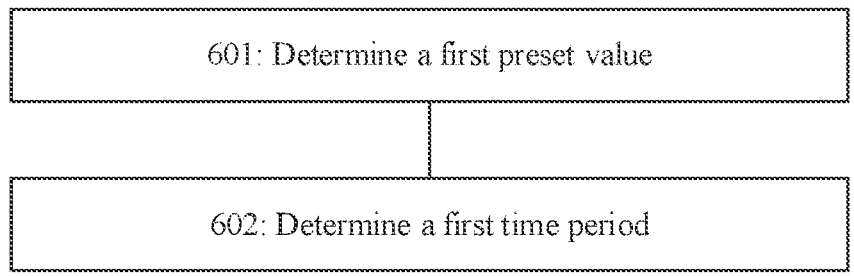
FIG. 6 is a schematic diagram of a method for determining a measurement time period of a downlink timing change rate according to an embodiment of this application.

FIG. 6 is a schematic diagram of a method for determining a measurement time period of a downlink timing change rate according to an embodiment of this application. The following describes in detail the method with reference to FIG. 6.

To facilitate understanding of this embodiment of this application, the following first defines several related technical terms.

A minimum measurement time period is a shortest time period required by a terminal device to measure a downlink timing change rate that satisfies a precision requirement. When a length of an actual measurement time period of the terminal device is greater than or equal to a length of the minimum measurement time period, the downlink timing change rate that satisfies the precision requirement can be obtained.

A first minimum measurement time period is a minimum measurement time period shared by terminal devices. Specifically, a plurality of terminal devices share one minimum measurement time period. When actual measurement time periods are greater than or equal to the first minimum measurement time periods, the plurality of terminal devices can all obtain the downlink timing change rate that satisfies the precision requirement.

It should be understood that, a maximum value of minimum measurement time periods of the plurality of terminal devices is determined as the first minimum measurement time period so that within the shared minimum measurement time period, all the terminal devices can obtain the downlink timing change rate that satisfies the precision requirement.

A second minimum measurement time period is a minimum measurement time period specific to the terminal device. Specifically, each terminal device has a specific minimum measurement time period. When an actual measurement time period is greater than or equal to the specific minimum measurement time period of each terminal device, the terminal device can obtain the downlink timing change rate that satisfies the precision requirement.

It should be understood that the first minimum measurement time period may be a maximum value of the second minimum measurement time period, that is, the second minimum measurement time period is not greater than the first minimum measurement time period.

601: Determine a first preset value

The first preset value is used to determine a measurement time period used when the terminal device measures the downlink timing change rate.

In an implementation, a satellite determines the first minimum measurement time period based on the foregoing minimum timing change rate, and determines the first preset value based on the first minimum measurement time period.

Because the first minimum measurement time period is the minimum measurement time period shared by the terminal devices in a beam, this implementation can ensure that the terminal devices in the beam can all measure, within duration of the first preset value, the downlink timing change rate that satisfies the precision requirement.

Because the satellite needs to obtain the minimum timing change rate when performing the foregoing communication methods, the satellite determines the first preset value based on the minimum timing change rate, to reduce an execution process and accelerate a decision.

In another implementation, a first minimum measurement time period corresponding to a first beam is determined based on a second mapping relationship, where the second mapping relationship is used to indicate a first minimum measurement time period corresponding to each of a plurality of beams including the first beam. The first minimum measurement time period corresponding to the first beam is determined as the first preset value.

In this implementation, a mapping relationship between a beam identifier and the first preset value is established, and the first preset value is determined based on the beam identifier and the mapping relationship.

In addition, a reference point terminal device may be further selected from the beam, and a minimum measurement time period of the reference point terminal device is determined as the first preset value. It should be understood that in this manner, measurement results of some non-reference point terminal devices may fail to satisfy an equivalent precision requirement.

Because all terminal devices in the beam can measure, within the first minimum measurement time period, the downlink timing change rate that satisfies the precision requirement, only the first preset value needs to be set for all the terminal devices in the beam, so that an execution process of a satellite can be reduced, and complexity of the mapping relationship and required storage space can be reduced.

In still another implementation, a second preset value may be further determined based on the second minimum measurement time period of the terminal device in the beam, where the second preset value is used to determine the measurement time period used when the terminal device measures the downlink timing change rate.

It should be understood that a higher timing change rate in the beam indicates a shorter time period required to measure the downlink timing change rate that satisfies the precision requirement. Therefore, in a same beam, a minimum measurement time period required by a terminal device corresponding to the minimum timing change rate is longest. Therefore, the second minimum measurement time period is not longer than the first minimum measurement time period.

Optionally, the second minimum measurement time period may be determined by collecting statistics on historical data of duration of measuring the downlink timing change rate by the terminal device.

The second minimum measurement time period is the minimum measurement time period specific to each terminal device. Therefore, separately controlling a measurement time period of the terminal device by using the second preset value has higher control precision, but requires a more complex algorithm and execution process.

602: Determine a first time period

The first time period represents actual duration of measuring the downlink timing change rate by the terminal device, for example, T1 shown in FIG. 6.

In an implementation, the terminal device receives second information, where the second information can indicate the first preset value in step 601, and the terminal device determines a length of the first time period based on the first preset value.

In another implementation, the terminal device receives second information, where the second information can indicate the second preset value in step 601, and the terminal device determines a length of the first time period based on the second preset value.

In still another implementation, the terminal device receives second information, where the second information can indicate the beam identifier in step 601, and the terminal device determines a length of the first time period based on the beam identifier and the second mapping relationship.

Optionally, the length of the first time period is greater than or equal to the first preset value.

When the length of the first time period is greater than or equal to the first preset value, all the terminal devices in the beam can measure, in the first time period, the downlink timing change rate that satisfies the precision requirement. In this implementation, only the first preset value needs to be set for all the terminal devices in the beam, so that the execution process of the satellite can be reduced, and complexity of the mapping relationship and the required storage space can be reduced.

Optionally, the length of the first time period is greater than or equal to the second preset value.

When the length of the first time period is greater than or equal to the second preset value, a corresponding terminal device can measure, in the first time period, the downlink timing change rate that satisfies the precision requirement. In this implementation, a corresponding second preset value needs to be set for each terminal device. Therefore, a measurement time period of each terminal device may be separately controlled. This has the higher control precision, but requires the more complex algorithm and execution process.

Duration of measuring the downlink timing change rate is controlled by setting a preset value, to ensure that the downlink timing change rate measured by the terminal device satisfies the precision requirement.

The embodiments of this application further provide a random access delay reduction method. The following describes the method in detail.

For ease of understanding the embodiments of this application, the following describes in detail a relationship between a moment of measuring a downlink timing change rate and a random access moment with reference to FIG. 7.

Figure 7A:
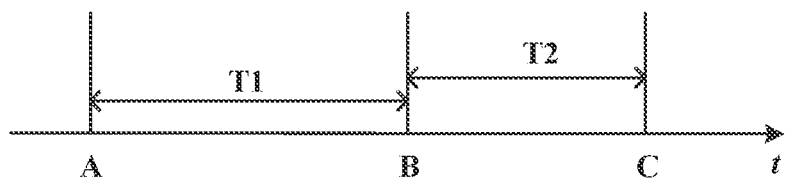
FIG. 7A and FIG. 7B each are a schematic diagram of a relationship between a measurement moment and a random access moment according to an embodiment of this application.
Figure 7B:
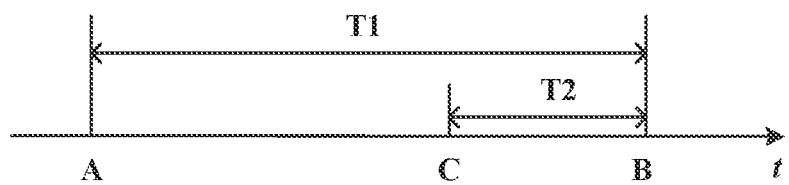

FIG. 7A and FIG. 7B each are a schematic diagram of a relationship between a measurement moment and a random access moment according to an embodiment of this application. As shown in FIG. 7A and FIGS. 7B, A, B, and C represent different moments on a time axis t, A represents a start moment of measuring a downlink timing change rate, B represents an end moment of measuring the downlink timing change rate, C represents a moment at which a terminal device initiates random access, a first time period T1 represents duration of measuring the downlink timing change rate, and a second time period T2 represents duration of an interval between completion of measurement and initiation of random access.

As shown in FIG. 7A, when the moment B is earlier than the moment C, it indicates that measurement of the downlink timing change rate may be ended, and a waiting time period is further required for the moment of random access, and a length of the waiting time period is T2.

As shown in FIG. 7B, when the moment B is later than the moment C, T2 in this case represents that measurement of the downlink timing change rate has not ended, but random access has already existed. In this case, a measurement process impacts random access. In this case, T2 is negative duration.

In an implementation, after completing measurement of the downlink timing change rate, the terminal device initiates random access.

Optionally, when the length of the first time period in 602 is greater than or equal to the first preset value, random access is initiated.

Optionally, when the length of the first time period in 602 is greater than or equal to the second preset value, random access is initiated.

Random access is proactively initiated after measurement is completed, so that a moment of subsequent random access is advanced, and a delay of random access can be reduced. In addition, determining the random access moment by using the first preset value can ensure that random access can be initiated as soon as possible and the random access delay can be reduced on the premise that the downlink timing change rate measured by the terminal device satisfies a precision requirement.

An example is used for description. An assumption is as follows.

T is a length of a preset measurement time period of all beams, and T is a fixed value;

T1 is a length of an actual measurement time period of a first beam, for example, the first time period T1 shown in FIG. 7A and FIG. 7B, and T1 is a variable value;

T2 is a delay before random access, for example, the second time period T2 shown in FIG. 7A and FIG. 7B, and T2 is a variable value; and T3 is a first preset value of the first beam, T3 is determined by using the method in step 601, T3 is a fixed value, and all terminal devices in the first beam can measure, within duration T3, the downlink timing change rate that satisfies the precision requirement.

The following analyzes in detail, based on different relationship cases between T3 and T, improvements of the random access delay reduction method in this embodiment of this application compared with a conventional method.

Case 1: T3<T

When T1<T3, the terminal device in the first beam measures the downlink timing change rate.

When T1=T3, the terminal device achieves measurement precision. However, because T>T3, the terminal device continues to perform measurement in this case, that is, prolongs a length of T1 until T1=T. In comparison, in the method in this embodiment of this application, different measurement duration is preset for different beams, and at least duration of Δ=T−T3 can be reduced, so that random access during this period is not impacted.

Case 2: T3=T

When T1<T3, the terminal device in the first beam measures the downlink timing change rate.

When T1=T3, the terminal device in the first beam ends measurement, and enters a waiting state until random access is received, where duration of the waiting state is the delay T2 before random access. In comparison, in the method in this embodiment of this application, random access is initiated after T1=T3, that is, random access is initiated after measurement ends. In this way, at least duration of T2 can be reduced, and random access is initiated faster.

Case 3: T3>T

When T1<T, the terminal device in the first beam measures the downlink timing change rate.

When T1=T, the terminal device ends measurement. However, because T3>T, the terminal device cannot ensure, within the duration T, that a measurement result satisfies the precision requirement. In comparison, in the method in this embodiment of this application, different first preset values are set for different beams, to ensure that the different beams can all obtain, within measurement duration determined by using the first preset value, the downlink timing change rates that satisfy the precision requirement.

Figure 8:
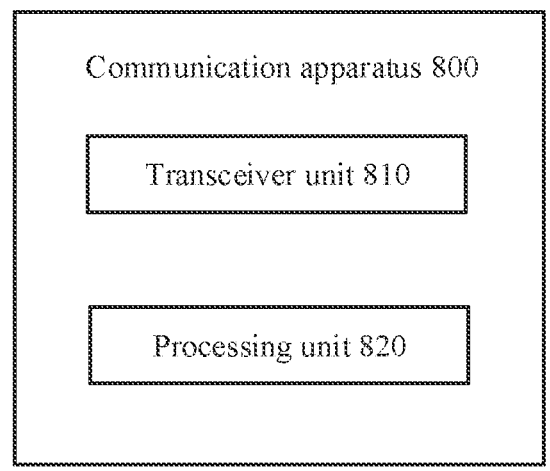
FIG. 8 is a schematic diagram of a communication apparatus according to an embodiment of this application.

FIG. 8 is a schematic diagram of a communication apparatus according to an embodiment of this application. The following describes the communication apparatus 800 with reference to FIG. 8. The communication apparatus 800 includes a transceiver unit 810 and a processing unit 820.

The transceiver unit 810 is configured to receive first information sent by a satellite, where the first information is used to indicate a first timing change rate range.

The processing unit 820 is configured to measure a downlink timing change rate to obtain a first downlink timing change rate; determine a first uplink timing change rate based on the first downlink timing change rate and the first timing change rate range; and perform uplink communication with the satellite based on the first uplink timing change rate.

Optionally, the communication apparatus 800 further includes a measurement unit 830, configured to measure the downlink timing change rate.

Optionally, the measurement unit 830 may alternatively be integrated into the processing unit 820, or may be independent of the processing unit 820.

In an implementation, the processing unit 820 measures and obtains the first downlink timing change rate, and determines the first uplink timing change rate based on the first downlink timing change rate.

In another implementation, the processing unit 820 may further adjust data of the measured first downlink timing change rate, and comprehensively consider a previous first downlink timing change rate and the current measurement data, for example, may introduce the previous first downlink timing change rate into the current measurement data in a weighted manner.

In still another implementation, the processing unit 820 determines the first timing change rate range based on the first information, and determines the first uplink timing change rate based on the first downlink timing change rate and the first timing change rate range.

In this implementation, the processing unit 820 may compare the first downlink timing change rate with the first timing change rate range, determine a second uplink timing change rate based on a comparison result, and determine the first uplink timing change rate based on the second uplink timing change rate. Alternatively, the processing unit 820 may determine a second uplink timing change rate based on the first downlink timing change rate, compare the second uplink timing change rate with the range, and determine the first uplink timing change rate based on a comparison result.

Optionally, the processing unit 820 determines the first uplink timing change rate based on the first downlink timing change rate when the first downlink timing change rate falls within the first timing change rate range;
determines the first uplink timing change rate based on a maximum value of the first timing change rate range when the first downlink timing change rate is greater than the maximum value of the first timing change rate range: or
determines the first uplink timing change rate based on a minimum value of the first timing change rate range when the first downlink timing change rate is less than the minimum value of the first timing change rate range.

Optionally, the processing unit 820 determines the second uplink timing change rate based on the first downlink timing change rate;
determines the second uplink timing change rate as the first uplink timing change rate when the second uplink timing change rate falls within the first timing change rate range;
determines a maximum value of the first timing change rate range as the first uplink timing change rate when the second uplink timing change rate is greater than the maximum value of the first timing change rate range; or
determines a minimum value of the first timing change rate range as the first uplink timing change rate when the second uplink timing change rate is less than the minimum value of the first timing change rate range.

In still another implementation, the first information sent by the satellite and received by the transceiver unit 810 includes a beam identifier of a first beam, where the first beam is a beam used by the communication apparatus to perform uplink communication. The processing unit is configured to determine, as the first timing change rate range based on a first mapping relationship, a preset range corresponding to the first beam, where the first mapping relationship is used to indicate a preset range corresponding to each of a plurality of beams including the first beam.

In still another implementation, the first information received by the transceiver unit 810 may further indicate a preset value, and the preset value can indicate the communication apparatus 800 to adjust duration of measuring the first downlink timing change rate. The first information may include an exact value of the preset value or another value that can indicate the preset value, or may be a second identifier that can point to the preset value of the communication apparatus or a beam or a mapping relationship of the preset value. After the second identifier is determined, the preset value corresponding to the second identifier may be determined based on the mapping relationship.

Optionally, the preset value may be the first preset value or the second preset value in step 601.

In still another implementation, the transceiver unit 810 receives second information, where the first information can indicate a preset value, and the preset value can indicate the communication apparatus 800 to adjust duration of measuring the first downlink timing change rate. The first information may include an exact value of the preset value or another value that can indicate the preset value, or may be a second identifier that can point to the preset value of the communication apparatus or a beam or a mapping relationship of the preset value. After the second identifier is determined, the preset value corresponding to the second identifier may be determined based on the mapping relationship.

Optionally, the preset value may be the first preset value or the second preset value in step 601.

Optionally, the processing unit 820 may further determine, based on a relationship between the preset value and a length of an actual measurement time period, whether to initiate random access of the communication apparatus, for example, stop measurement and initiate random access when the actual measurement time period reaches the preset value.

Optionally, the communication apparatus 800 may further include a storage unit 840. The storage unit 840 may store all or a part of information in the mapping relationship, the preset range, and the preset value. The storage unit 840 may alternatively be integrated into the processing unit 820, or may be independent of the processing unit 820.

In still another implementation, the communication apparatus 800 may be a chip or an integrated circuit.

In this implementation, the transceiver unit 810 shown in FIG. 8 may be a communication interface. Optionally, the communication interface may be an input/output interface or a transceiver circuit. The processing unit 820 may be a processing apparatus. Some or all functions of the processing apparatus may be implemented by using software.

In an example, the processing apparatus may include a memory and a processor. The memory is configured to store a computer program. The processor reads and executes the computer program stored in the memory, to perform processing implemented inside the terminal device in the embodiments, for example, to perform the foregoing processing performed by the processing unit 820.

Optionally, the processing apparatus may include only the processor, and the memory configured to store the computer program is located outside the processing apparatus. The processor is connected to the memory through a circuit/cable, to read and execute the computer program stored in the memory.

In another example, some or all functions of the processing apparatus may be implemented by using hardware. For example, the processing apparatus includes an input interface circuit, a logic circuit, and an output interface circuit. The input interface circuit is configured to receive first information. The logic circuit is configured to obtain a first downlink timing change rate and determine a first uplink timing change rate. The output interface circuit is configured to output the first uplink timing change rate.

Optionally, the input interface circuit is configured to receive second information. The logic circuit is configured to determine a preset value of a measurement time period. The output interface circuit is configured to output the preset value.

Figure 9:
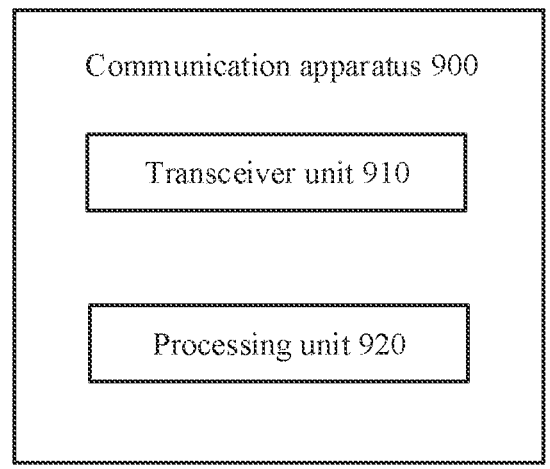
FIG. 9 is a schematic diagram of a communication apparatus according to an embodiment of this application.

FIG. 9 is a schematic diagram of a communication apparatus according to an embodiment of this application. The following describes the communication apparatus 900 with reference to FIG. 9. The communication apparatus 900 includes a processing unit 920 and a transceiver unit 910.

The transceiver unit 910 is configured to send first information to a terminal device, where the first information is used to indicate a first timing change rate range.

The processing unit 920 is configured to determine the first timing change rate range, to enable the terminal device to determine, based on a measured first downlink timing change rate and the first timing change rate range, a first uplink timing change rate used when the communication apparatus performs uplink communication with the terminal device.

In an implementation, the processing unit 920 may determine the first timing change rate range by determining a maximum timing change rate and a minimum timing change rate. Correspondingly, the first information can indicate the maximum timing change rate and the minimum timing change rate.

In another implementation, the processing unit 920 may alternatively determine the first timing change rate range by determining a second timing change rate and then setting a numerical range including the second timing change rate. Correspondingly, the first information can indicate the second timing change rate or the numerical range including the second timing change rate.

In still another implementation, the processing unit 920 may alternatively determine a preset range corresponding to a first beam as the first timing change rate range based on a first mapping relationship, where the first mapping relationship is used to indicate a preset range corresponding to each of a plurality of beams including the first beam. Correspondingly, the first information of the transceiver unit 910 is used to indicate a first preset range corresponding to the first beam.

In still another implementation, the processing unit 920 may further determine a first preset value, where the first preset value may indicate the terminal device to determine duration of measuring a downlink timing change rate. Correspondingly, the transceiver unit 910 is further configured to send second information to the terminal device, where the second information is used to indicate the first preset value, to enable the terminal device to determine, based on the first preset value, the duration of measuring the downlink timing change rate.

In an example, the processing unit 920 is configured to determine the first preset value based on a minimum value of the first timing change rate range. The transceiver unit 910 is configured to send the second information to the terminal device, where the second information is used to indicate the first preset value, to enable the terminal device to determine, based on the first preset value, the duration of measuring the downlink timing change rate.

In another example, the processing unit 920 is configured to determine the first preset value based on a preset value corresponding to the first beam in a second mapping relationship, where the second mapping relationship is used to indicate a preset value corresponding to each of the plurality of beams including the first beam, and the first beam is a beam used by the terminal device to perform the uplink communication. The transceiver unit 910 is configured to send the second information to the terminal device, where the second information is used to indicate the first preset value, to enable the terminal device to determine, based on the first preset value, the duration of measuring the downlink timing change rate.

Optionally, the communication apparatus 900 may further include an obtaining unit 930, configured to obtain a current status parameter of the satellite. The obtaining unit 930 may alternatively be integrated into the processing unit 920, or may be independent of the processing unit 920.

Optionally, the communication apparatus 900 may further include a storage unit 940, configured to store some or all of the foregoing data. The storage unit 940 may alternatively be integrated into the processing unit 920, or may be independent of the processing unit 920.

In still another implementation, the communication apparatus 900 may be a chip or an integrated circuit.

In this implementation, the transceiver unit 910 shown in FIG. 9 may be a communication interface. Optionally, the communication interface may be an input/output interface or a transceiver circuit. The processing unit 920 may be a processing apparatus. Some or all functions of the processing apparatus may be implemented by using software.

In an example, the processing apparatus may include a memory and a processor. The memory is configured to store a computer program. The processor reads and executes the computer program stored in the memory, to perform processing implemented inside the terminal device in the embodiments, for example, to perform the foregoing processing performed by the processing unit 920.

Optionally, the processing apparatus may include only the processor, and the memory configured to store the computer program is located outside the processing apparatus. The processor is connected to the memory through a circuit/cable, to read and execute the computer program stored in the memory.

In another example, some or all functions of the processing apparatus may be implemented by using hardware. In this implementation, the processing apparatus includes an input interface circuit, a logic circuit, and an output interface circuit. The input interface circuit is configured to receive a satellite status parameter. The logic circuit is configured to determine a first timing change rate range. The output interface circuit is configured to output the first timing change rate range.

Optionally, the logic circuit is configured to determine a preset value. The output interface circuit is configured to output indication information of the preset value.

Figure 10:
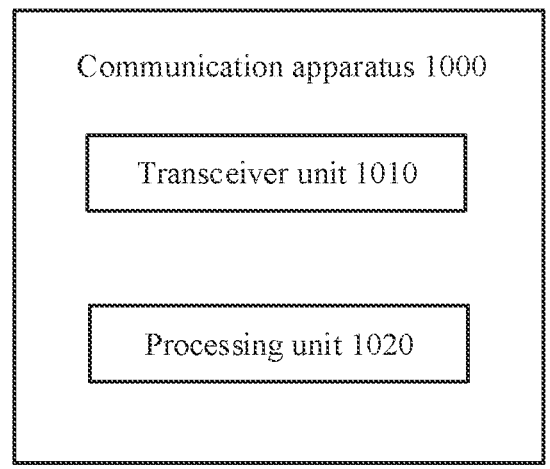
FIG. 10 is a schematic diagram of a communication apparatus according to an embodiment of this application.

FIG. 10 is a schematic diagram of a communication apparatus according to an embodiment of this application. The following describes the communication apparatus 1000 with reference to FIG. 10. The communication apparatus 1000 includes a transceiver unit 1010 and a processing unit 1020.

The transceiver unit 1010 is configured to receive first information sent by a satellite, where the first information is used to indicate a first uplink timing change rate.

The processing unit 1020 is configured to perform uplink communication with the satellite based on the first uplink timing change rate.

In an implementation, the first information received by the transceiver unit 1010 is specifically used to indicate a first timing change rate range. The processing unit 1020 determines an average value of the first timing change rate range as the first uplink timing change rate based on the first timing change rate range.

Optionally, the first timing change rate range is obtained by using the methods shown in FIG. 5.

In this implementation, the first information received by the transceiver unit 1010 is specifically used to indicate a maximum timing change rate and a minimum timing change rate in the first timing change rate range. The processing unit 1020 determines the first uplink timing change rate based on an average value of the maximum timing change rate and the minimum timing change rate.

Optionally, the first timing change rate range is obtained by using the methods shown in FIG. 5.

In another implementation, the communication apparatus 1000 may be a chip or an integrated circuit.

In this implementation, the transceiver unit 1010 shown in FIG. 10 may be a communication interface. Optionally, the communication interface may be an input/output interface or a transceiver circuit. The processing unit 1020 may be a processing apparatus. Some or all functions of the processing apparatus may be implemented by using software.

In an example, the processing apparatus may include a memory and a processor. The memory is configured to store a computer program. The processor reads and executes the computer program stored in the memory, to perform processing implemented inside the terminal device in the embodiments, for example, to perform the foregoing processing performed by the processing unit 1020.

Optionally, the processing apparatus may include only the processor, and the memory configured to store the computer program is located outside the processing apparatus. The processor is connected to the memory through a circuit/cable, to read and execute the computer program stored in the memory.

In another example, some or all functions of the processing apparatus may be implemented by using hardware. For example, the processing apparatus includes an input interface circuit, a logic circuit, and an output interface circuit. The input interface circuit is configured to receive the first information. The logic circuit is configured to determine the first uplink timing change rate based on the first information. The output interface circuit is configured to output the first uplink timing change rate.

Figure 11:
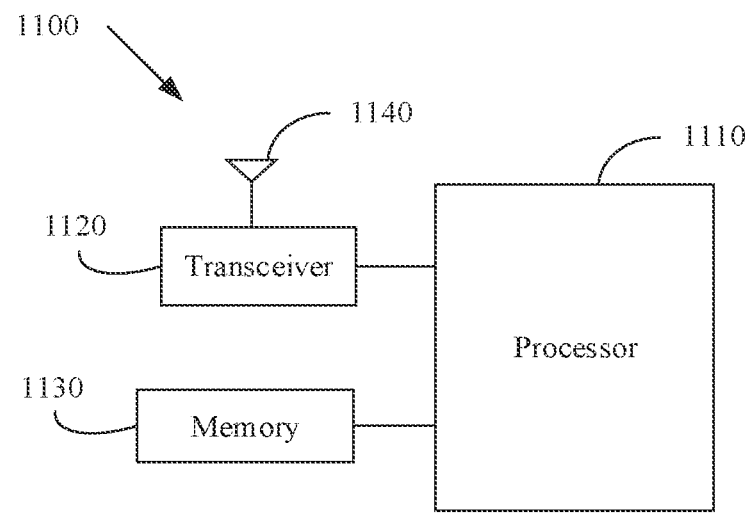
FIG. 11 is a schematic diagram of a terminal device according to an embodiment of this application.

FIG. 11 is a schematic diagram of a structure of a terminal device according to an embodiment of this application. As shown in FIG. 11, the terminal device 1100 includes a processor 1110 and a transceiver 1120.

Optionally, the terminal device 1100 further includes a memory 1130. The processor 1110, the transceiver 1120, and the memory 1130 may communicate with each other through an internal connection path, to transfer a control signal and/or a data signal.

The memory 1130 is configured to store a computer program. The processor 1110 is configured to execute the computer program stored in the memory 1130, to implement the functions of the communication apparatus 800 in the foregoing apparatus embodiment.

Specifically, the processor 1110 may be configured to perform operations and/or processing performed by the processing unit 820 in the apparatus embodiment (for example, FIG. 8), and the transceiver 1120 is configured to perform operations and/or processing performed by the transceiver unit 810.

Optionally, the memory 1130 may alternatively be integrated into the processor 1110, or may be independent of the processor 1110.

Optionally, the terminal device 1100 may further include an antenna 1140, configured to transmit a signal output by the transceiver 1120. Alternatively, the transceiver 1120 receives a signal by using the antenna.

In addition, the terminal device 1100 may further include one or more of a power supply, an input unit, an output unit, an audio circuit, a camera, a sensor, and the like that are not marked and described one by one.

Optionally, when the communication apparatus 800 is a terminal device, the transceiver unit 810 shown in FIG. 8 may be the transceiver 1120 shown in FIG. 11, and the processing unit 820 may be the processor 1110 shown in FIG. 11.

Optionally, when the communication apparatus 800 is a chip or an integrated circuit, the transceiver unit 810 shown in FIG. 8 may be a communication interface, and the processing unit 820 is a processor.

Optionally, when the communication apparatus 1000 is a terminal device, the transceiver unit 1010 shown in FIG. 10 may be the transceiver 1120 shown in FIG. 11, and the processing unit 1020 may be the processor 1110 shown in FIG. 11.

Optionally, when the communication apparatus 1000 is a chip or an integrated circuit, the transceiver unit 1010 shown in FIG. 10 may be a communication interface, and the processing unit 1020 is a processor.

Figure 12:
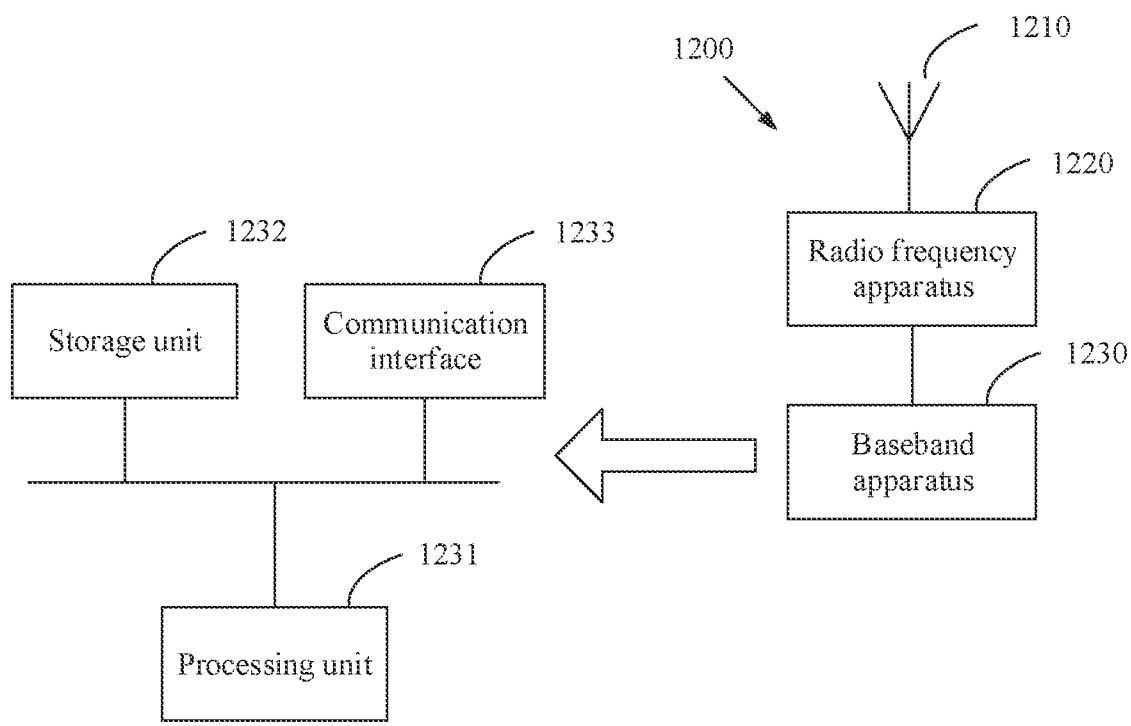
FIG. 12 is a schematic diagram of a structure of a network device according to an embodiment of this application.

FIG. 12 is a schematic diagram of a structure of a network device according to an embodiment of this application. As shown in FIG. 12, the network device 1200 includes an antenna 1210, a radio frequency apparatus 1220, and a baseband apparatus 1230. The antenna 1210 is connected to the radio frequency apparatus 1220. In an uplink direction, the radio frequency apparatus 1220 receives, by using the antenna 1210, a signal from a terminal device, and sends the received signal to the baseband apparatus 1230 for processing. In a downlink direction, the baseband apparatus 1230 generates a signal that needs to be sent to the terminal device, and sends the generated signal to the radio frequency apparatus 1220. The radio frequency apparatus 1220 transmits the signal by using the antenna 1210.

The baseband apparatus 1230 may include one or more processing units 1231. The processing unit 1231 may be specifically a processor.

In addition, the baseband apparatus 1230 may further include one or more storage units 1232 and one or more communication interfaces 1233. The storage unit 1232 is configured to store a computer program and/or data. The communication interface 1233 is configured to exchange information with the radio frequency apparatus 1220. The storage unit 1232 may be specifically a memory, and the communication interface 1233 may be an input/output interface or a transceiver circuit.

Optionally, the storage unit 1232 may be a storage unit located on a same chip as the processing unit 1231, that is, an on-chip storage unit, or may be a storage unit located on a different chip from the processing unit, that is, an off-chip storage unit. This is not limited in this application.

In an implementation, when the communication apparatus 900 shown in FIG. 9 completely corresponds to the network device in the method embodiment, the communication apparatus 900 may be implemented by using the network device 1200 shown in FIG. 12. For example, the processing unit 920 in the communication apparatus 900 shown in FIG. 9 may be the baseband apparatus 1230 shown in FIG. 12, and the transceiver unit 910 may be the radio frequency apparatus 1220 shown in FIG. 12.

In addition, this application further provides a communication system, including one or more terminal devices and one or more network devices provided in this application.

This application further provides a computer-readable storage medium. The computer-readable medium stores program code to be executed by a terminal device, and the program code includes an operation used to perform any one of the methods performed by the terminal device in the embodiments of this application.

This application further provides a computer-readable storage medium. The computer-readable medium stores program code to be executed by a network device, and the program code includes an operation used to perform any one of the methods performed by the network device in the embodiments of this application.

This application further provides a computer program product. The computer program product includes computer program code. When the computer program code is run on a computer, the computer is enabled to perform an operation performed by the terminal device in any method embodiment.

This application further provides a computer program product. The computer program product includes computer program code. When the computer program code is run on a computer, the computer is enabled to perform an operation performed by the network device in any method embodiment.

This application further provides a chip, and the chip includes a processor. A memory configured to store a computer program is disposed independent of the chip. The processor is configured to execute the computer program stored in the memory, to perform an operation performed by the terminal device in any method embodiment.

Further, the chip may further include a communication interface. The communication interface may be an input/output interface, an input/output circuit, or the like. Further, the chip may further include the memory.

This application further provides a chip, and the chip includes a processor. A memory configured to store a computer program is disposed independent of the chip. The processor is configured to execute the computer program stored in the memory, to perform an operation performed by the network device in any method embodiment.

Further, the chip may further include a communication interface. The communication interface may be an input/output interface, an input/output circuit, or the like. Further, the chip may further include the memory.

The processor in the embodiments of this application may be an integrated circuit chip, and has a signal processing capability. In an implementation process, steps in the foregoing method embodiments may be completed by using a hardware integrated logical circuit in the processor or by using instructions in a form of software. The processor may be a general-purpose processor, a digital signal processor (DSP), an application specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor or the like. The steps of the methods disclosed in the embodiments of this application may be directly executed and completed by using a hardware encoding processor, or may be executed and completed by using a combination of hardware and software modules in the encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware in the processor.

The memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples but not limitative description, RAMs in many forms are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memory in the system and method described in this specification includes but is not limited to these and any memory of another appropriate type.

A person of ordinary skill in the art may be aware that, in combination with units and algorithm steps in the examples described in the embodiments disclosed in this specification, the embodiments may be implemented by electronic hardware or a combination of computer software and electronic hardware. This specifically depends on specific applications and design constraints of the technical solutions. A person skilled in the art may use different methods to implement the functions for each particular application, but it should not be considered that the implementation goes beyond the scope of this application.

The units described as separate parts may or may not be physically separate, and parts displayed as units may or may not be physical units, that is, may be located in one location, or may be distributed on a plurality of network units. Some or all of the units may be selected based on an actual requirement to achieve objectives of the embodiments of this application.

In addition, functional units in the embodiments of this application may be integrated into one processing unit, each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions in this application essentially, the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application.

The foregoing descriptions are merely specific implementations of this application, but the protection scope of this application is not limited thereto. Any variation or replacement readily figured out by a person skilled in the art within the technical scope disclosed in this application shall fall within the protection scope of this application.

What is claimed is:

1. A satellite communication method, comprising:
   receiving, by a terminal device, first information sent by a satellite, wherein the first information indicates a first timing change rate range;
   measuring a downlink timing change rate to obtain a first downlink timing change rate;
   determining a first uplink timing change rate based on the first downlink timing change rate and the first timing change rate range, wherein a timing change rate is the first downlink timing change rate or a second uplink timing change rate determined based on the first downlink timing change rate, and wherein determining the first uplink timing change rate based on the first downlink timing change rate and the first timing change rate range comprises:
      determining the first uplink timing change rate based on the timing change rate when the timing change rate falls within the first timing change rate range;
      determining the first uplink timing change rate based on a maximum value of the first timing change rate range when the timing change rate is greater than the maximum value of the first timing change rate range; or
      determining the first uplink timing change rate based on a minimum value of the first timing change rate range when the timing change rate is less than the minimum value of the first timing change rate range; and
   performing uplink communication with the satellite based on the first uplink timing change rate.

2. The method according to claim 1, wherein the timing change rate is the second uplink timing change rate, and wherein determining the first uplink timing change rate based on the first downlink timing change rate and the first timing change rate range comprises:
   determining the second uplink timing change rate based on the first downlink timing change rate; and
   determining the second uplink timing change rate as the first uplink timing change rate when the second uplink timing change rate falls within the first timing change rate range;
   determining the maximum value of the first timing change rate range as the first uplink timing change rate when the second uplink timing change rate is greater than the maximum value of the first timing change rate range; or
   determining the minimum value of the first timing change rate range as the first uplink timing change rate when the second uplink timing change rate is less than the minimum value of the first timing change rate range.

3. The method according to claim 1, wherein the timing change rate is the first downlink timing change rate, and wherein determining the first uplink timing change rate based on the first downlink timing change rate and the first timing change rate range comprises:
   determining the first uplink timing change rate based on the first downlink timing change rate when the first downlink timing change rate falls within the first timing change rate range;
   determining the first uplink timing change rate based on the maximum value of the first timing change rate range when the first downlink timing change rate is greater than the maximum value of the first timing change rate range; or
   determining the first uplink timing change rate based on the minimum value of the first timing change rate range when the first downlink timing change rate is less than the minimum value of the first timing change rate range.

4. The method according to claim 1, wherein the first information indicates a maximum timing change rate and a minimum timing change rate in the first timing change rate range.

5. The method according to claim 1, wherein the first information comprises a beam identifier of a first beam, and the first beam is used by the terminal device to perform the uplink communication, and the method further comprises:
   determining, as the first timing change rate range based on a first mapping relationship, a preset range corresponding to the first beam, wherein the first mapping relationship indicates a preset range corresponding to each of a plurality of beams comprising the first beam.

6. The method according to claim 1, wherein measuring the downlink timing change rate comprises:
   measuring the downlink timing change rate within a first time period, wherein a length of the first time period is greater than or equal to a first preset value, wherein:
      the first preset value is determined based on the minimum value of the first timing change rate range; or
      the first preset value is a preset value corresponding to a first beam in a second mapping relationship, wherein the second mapping relationship indicates a preset value corresponding to each of a plurality of beams comprising the first beam, and the first beam is used by the terminal device to perform the uplink communication.

7. The method according to claim 6, wherein the method further comprises:
receiving, by the terminal device, second information sent by the satellite, wherein the second information indicates the first preset value.

8. The method according to claim 1, wherein the downlink timing change rate is periodically measured.

9. A satellite communication method, comprising:
determining, by a satellite, a first timing change rate range; and
sending first information to a terminal device, wherein the first information indicates the first timing change rate range, wherein the first information enables the terminal device to determine, based on a measured first downlink timing change rate and the first timing change rate range, a first uplink timing change rate used when the satellite performs uplink communication with the terminal device, and wherein determining the first timing change rate range comprises determining, as the first timing change rate range based on a first mapping relationship, a preset range corresponding to a first beam, wherein the first mapping relationship indicates a preset range corresponding to each of a plurality of beams comprising the first beam, and wherein the first information indicates a first preset range corresponding to the first beam.

10. The method according to claim 9, wherein determining, by the satellite, the first timing change rate range comprises:
obtaining a satellite status parameter, wherein the satellite status parameter comprises at least one of a satellite height, a geocentric angle, or a satellite angular velocity; and
determining the first timing change rate range based on the satellite status parameter.

11. The method according to claim 10, wherein the first information indicates a maximum timing change rate and a minimum timing change rate in the first timing change rate range.

12. The method according to claim 9, wherein the method further comprises:
determining, by the satellite, a first preset value based on a minimum value of the first timing change rate range; and
sending second information to the terminal device, wherein the second information indicates the first preset value, and wherein the second information enables the terminal device to determine, based on the first preset value, duration of measuring a downlink timing change rate.

13. The method according to claim 9, wherein the method further comprises:
determining a first preset value based on a preset value corresponding to the first beam in a second mapping relationship, wherein the second mapping relationship indicates a preset value corresponding to each of the plurality of beams comprising the first beam, and the first beam is used by the terminal device to perform the uplink communication; and
sending second information to the terminal device, wherein the second information indicates the first preset value, and wherein the second information enables the terminal device to determine, based on the first preset value, duration of measuring a downlink timing change rate.

14. A communication apparatus, comprising:
one or more processors and one or more memories storing a computer program including instructions that, when executed by the one or more processors, cause the one or more processors to:
receive first information sent by a satellite, wherein the first information indicates a first timing change rate range;
measure a downlink timing change rate to obtain a first downlink timing change rate;
determine a first uplink timing change rate based on the first downlink timing change rate and the first timing change rate range, wherein a timing change rate is the first downlink timing change rate or a second uplink timing change rate determined based on the first downlink timing change rate, and wherein determining the first uplink timing change rate based on the first downlink timing change rate and the first timing change rate range comprises:
determining the first uplink timing change rate based on the timing change rate when the timing change rate falls within the first timing change rate range;
determining the first uplink timing change rate based on a maximum value of the first timing change rate range when the timing change rate is greater than the maximum value of the first timing change rate range; or
determining the first uplink timing change rate based on a minimum value of the first timing change rate range when the timing change rate is less than the minimum value of the first timing change rate range; and
perform uplink communication with the satellite based on the first uplink timing change rate.

15. The apparatus according to claim 14, wherein the timing change rate is the second uplink timing change rate, and wherein the computer program further includes instructions that, when executed by the one or more processors, cause the one or more processors to:
determine the second uplink timing change rate based on the first downlink timing change rate; and
determine the second uplink timing change rate as the first uplink timing change rate when the second uplink timing change rate falls within the first timing change rate range;
determine the maximum value of the first timing change rate range as the first uplink timing change rate when the second uplink timing change rate is greater than the maximum value of the first timing change rate range; or
determine the minimum value of the first timing change rate range as the first uplink timing change rate when the second uplink timing change rate is less than the minimum value of the first timing change rate range.

16. The apparatus according to claim 14, wherein the timing change rate is the first downlink timing change rate, and wherein the computer program further includes instructions that, when executed by the one or more processors, cause the one or more processors to:
determine the first uplink timing change rate as the first downlink timing change rate when the first downlink timing change rate falls within the first timing change rate range;
determine the first uplink timing change rate based on the maximum value of the first timing change rate range when the first downlink timing change rate is greater than the maximum value of the first timing change rate range; or determine the first uplink timing change rate based on the minimum value of the first timing change rate range when the first downlink timing change rate is less than the minimum value of the first timing change rate range.

17. The apparatus according to claim 14, wherein the first information indicates a maximum timing change rate and a minimum timing change rate in the first timing change rate range.

18. The apparatus according to claim 14, wherein the first information comprises a beam identifier of a first beam, and the first beam is used by the communication apparatus to perform the uplink communication, and wherein the computer program further includes instructions that, when executed by the one or more processors, cause the one or more processors to:

determine, as the first timing change rate range based on a first mapping relationship, a preset range corresponding to the first beam, wherein the first mapping relationship indicates a preset range corresponding to each of a plurality of beams comprising the first beam.

19. The apparatus according to claim 14, wherein the computer program further includes instructions that, when executed by the one or more processors, cause the one or more processors to:

measure the downlink timing change rate within a first time period, wherein a length of the first time period is greater than or equal to a first preset value, wherein:
the first preset value is determined based on the minimum value of the first timing change rate range; or
the first preset value is a preset value corresponding to a first beam in a second mapping relationship, wherein the second mapping relationship indicates a preset value corresponding to each of a plurality of beams comprising the first beam, and the first beam is used by the communication apparatus to perform the uplink communication.

* * * * *